United States Patent [19]

Grawey

[11] 4,124,053

[45] Nov. 7, 1978

[54] TWO PIECE INNER TUBE

[75] Inventor: Charles E. Grawey, Peoria, Ill.

[73] Assignee: Caterpillar Tractor Co., Peoria, Ill.

[21] Appl. No.: 741,652

[22] Filed: Nov. 15, 1976

Related U.S. Application Data

[60] Division of Ser. No. 588,732, Jun. 20, 1975, Pat. No. 4,044,085, which is a continuation-in-part of Ser. No. 385,956, Aug. 6, 1973, abandoned.

[51] Int. Cl.² ............................................. B60C 5/04
[52] U.S. Cl. ................................. 152/349; 156/118
[58] Field of Search ........................... 152/349, 350; 156/110 R, 118, 123, 126; 264/89, 92, 93

[56] References Cited

U.S. PATENT DOCUMENTS

| | | | |
|---|---|---|---|
| 1,709,796 | 4/1929 | Kuhlke | 152/349 |
| 2,592,724 | 4/1952 | O'Neil | 156/118 |
| 3,606,921 | 9/1971 | Grawey | 152/379.1 |

Primary Examiner—Albert J. Makay
Assistant Examiner—Carl Rowold
Attorney, Agent, or Firm—John W. Grant

[57] ABSTRACT

In the formation of an elastomeric tube or the like on a toroidal core, elastomeric material is applied to the core generally along one side of the core, and force-applying means are utilized to press annular portions of the so-deposited elastomeric material onto the core. Cutting means are also included for cutting away elastomeric material not deposited on the core. The core and elastomeric material deposited thereon are then turned over and the operation is repeated, whereby elastomeric tube means or the like are provided on the toroidal core.

2 Claims, 33 Drawing Figures

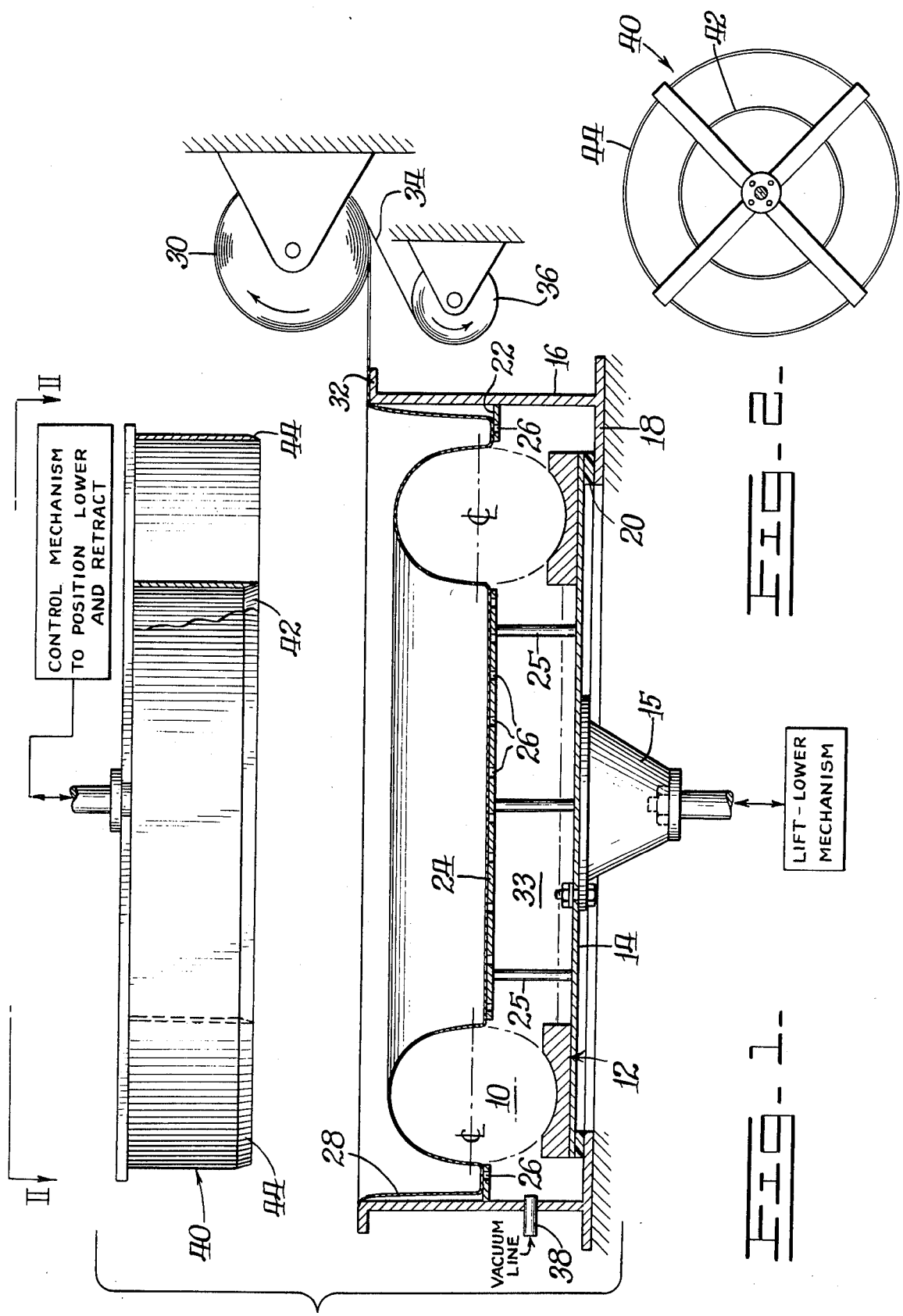

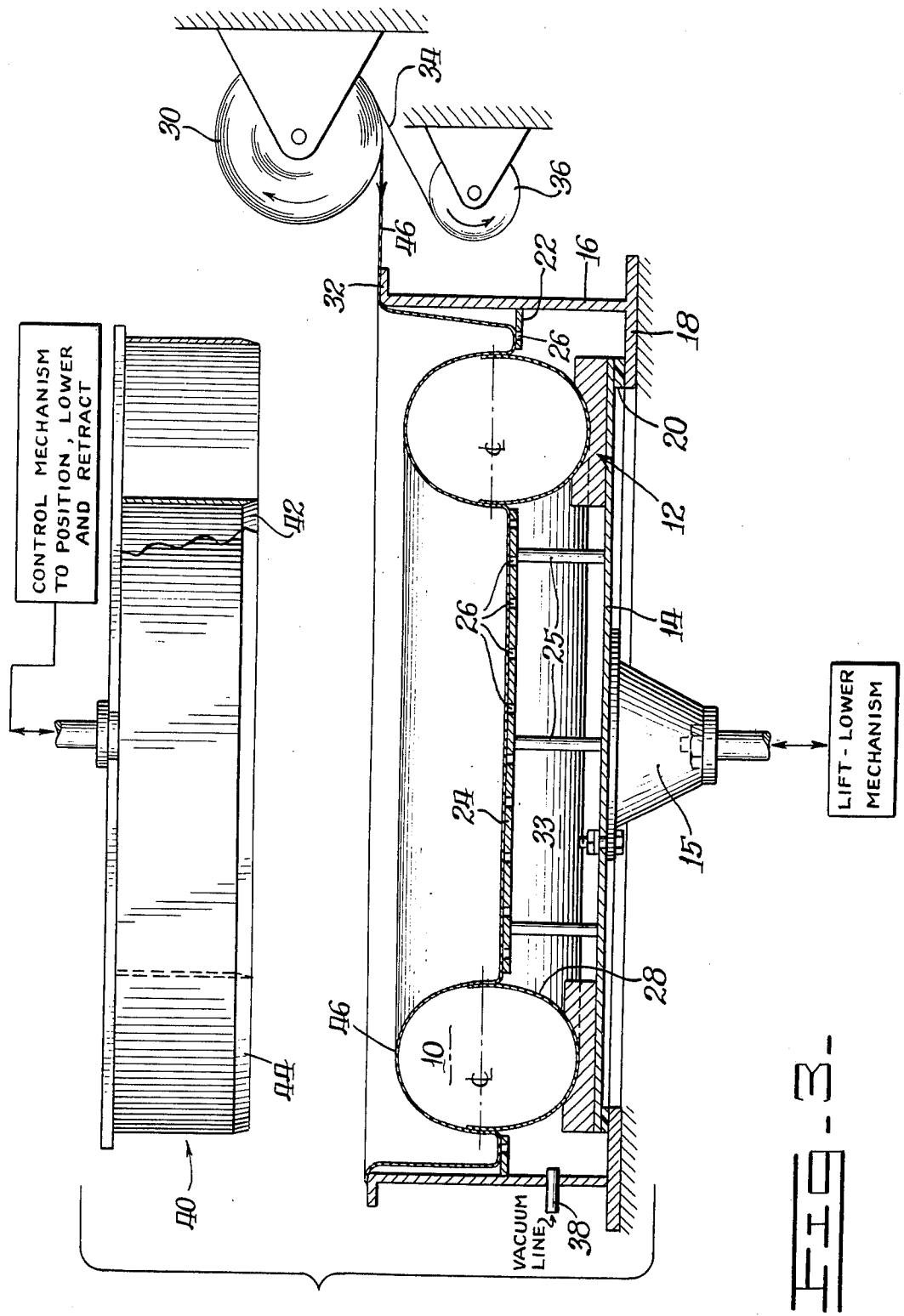

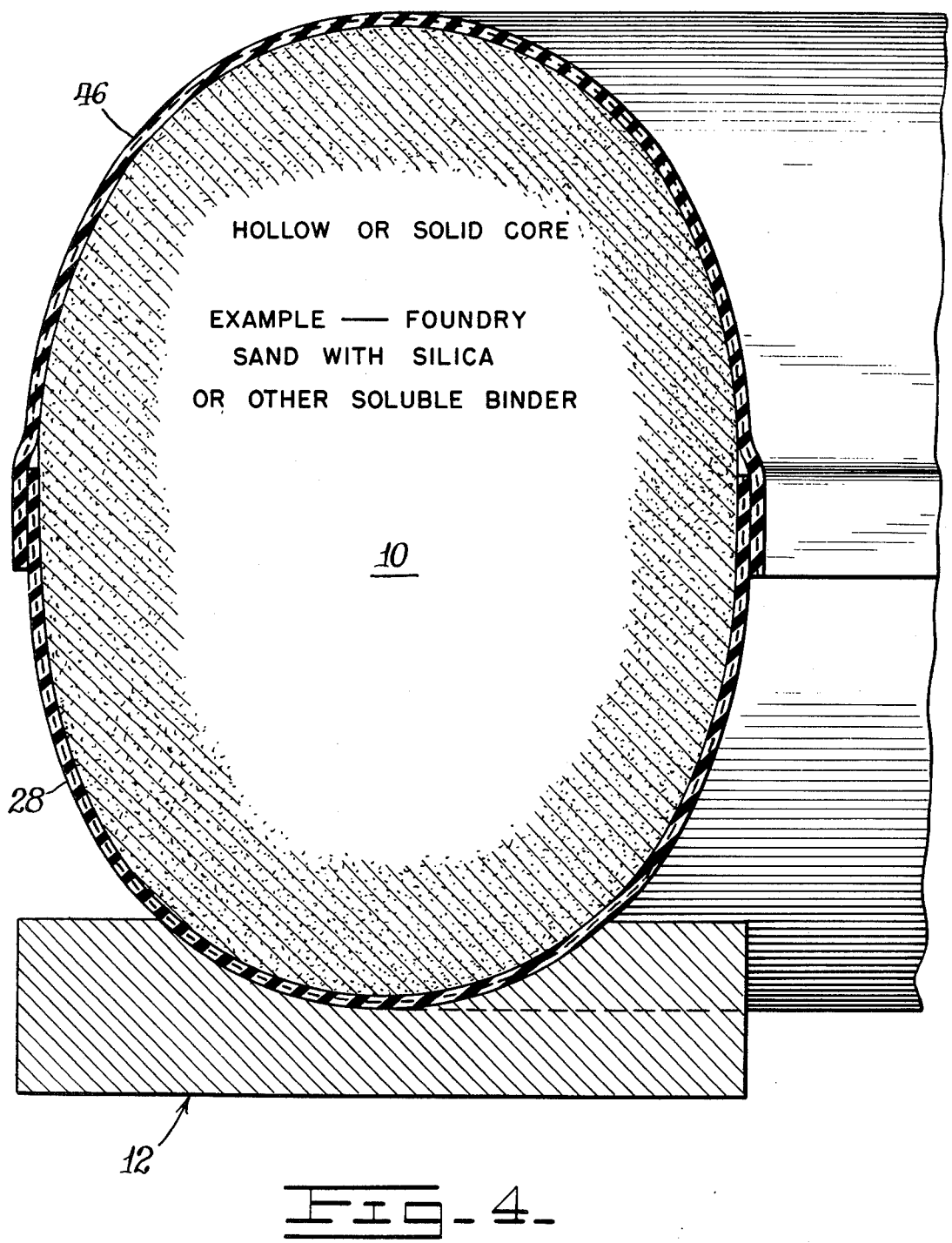
Fig-4-

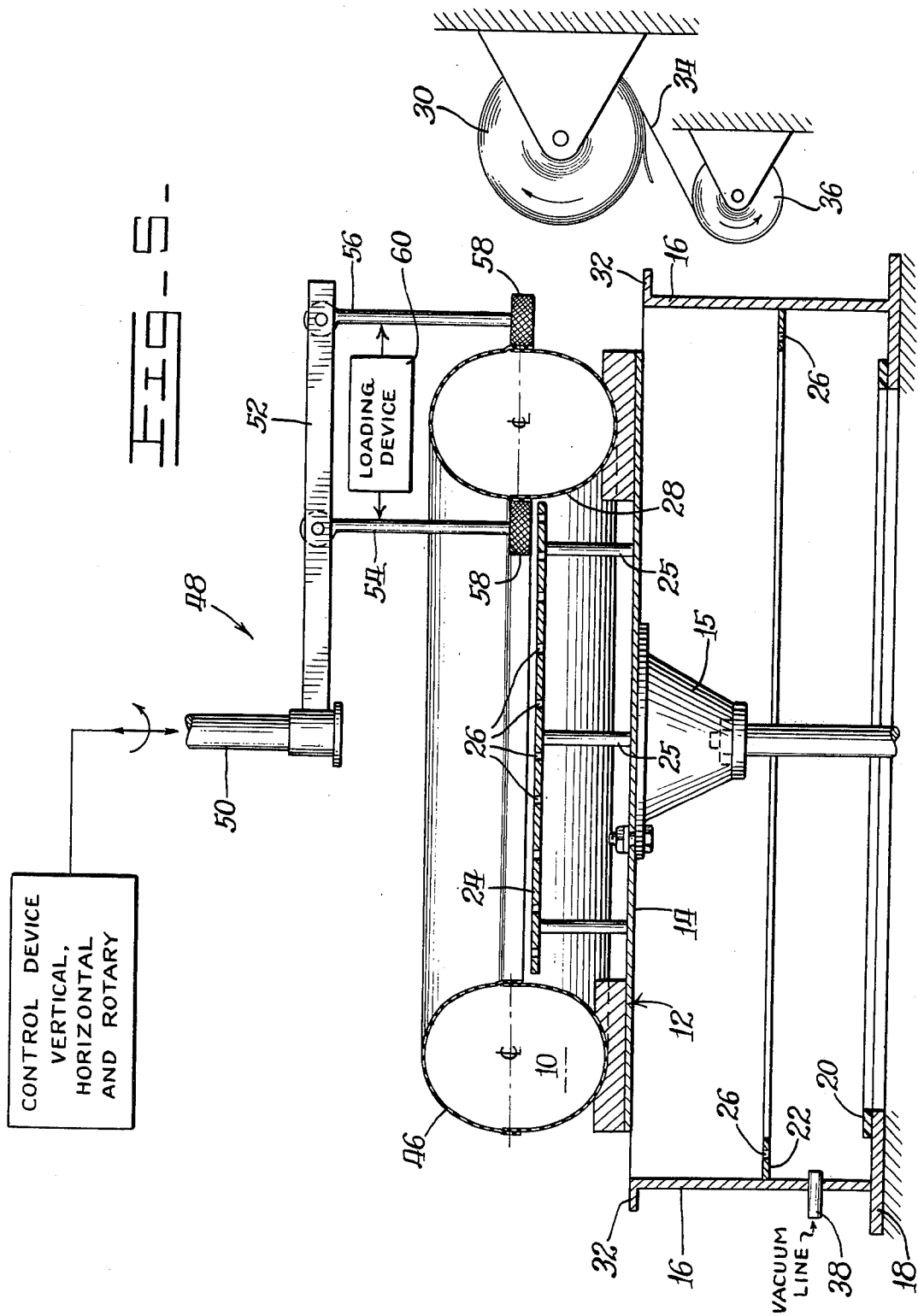

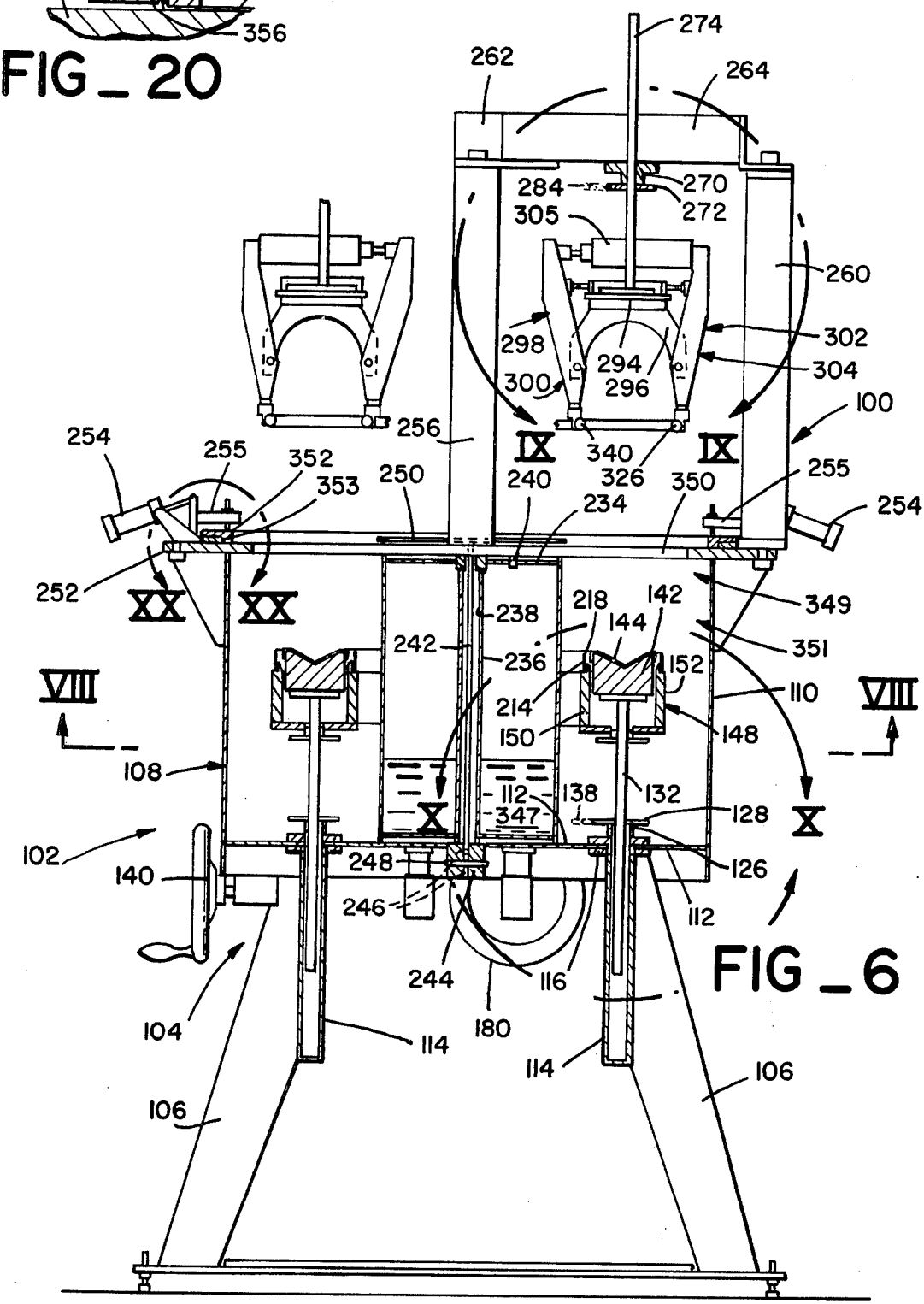

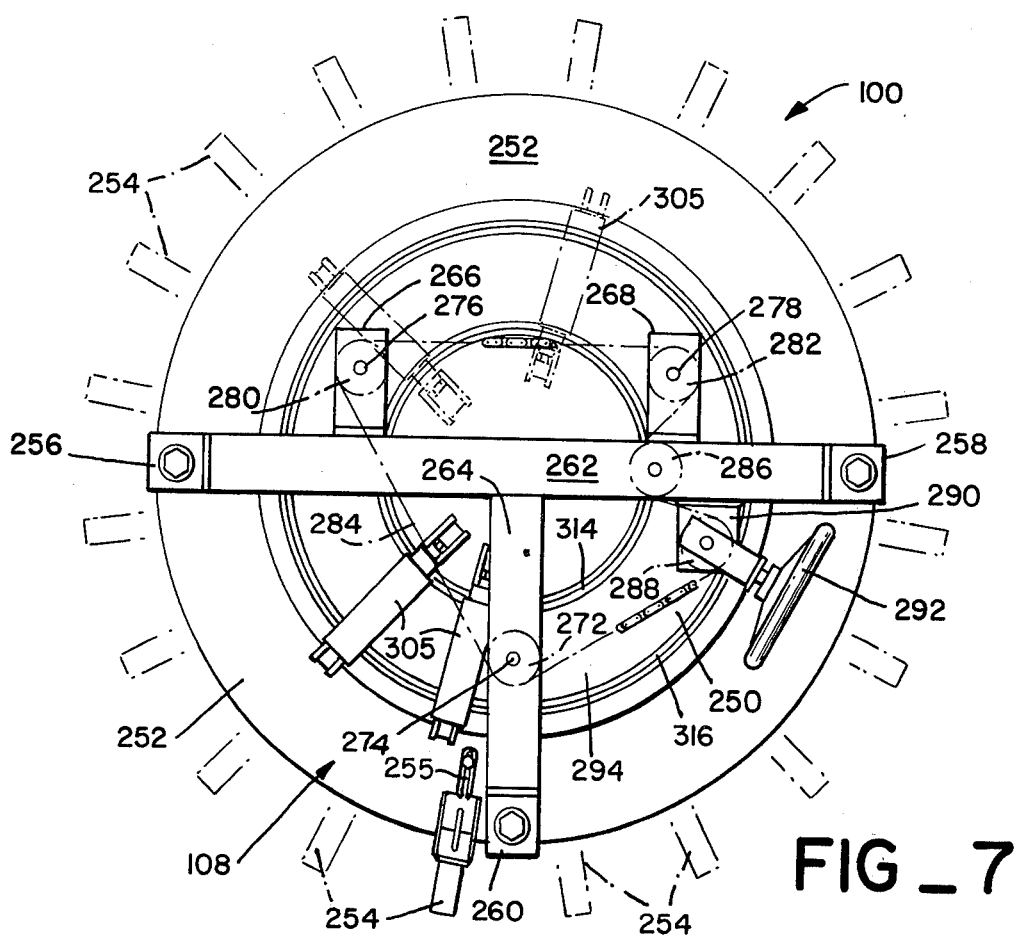
FIG_7
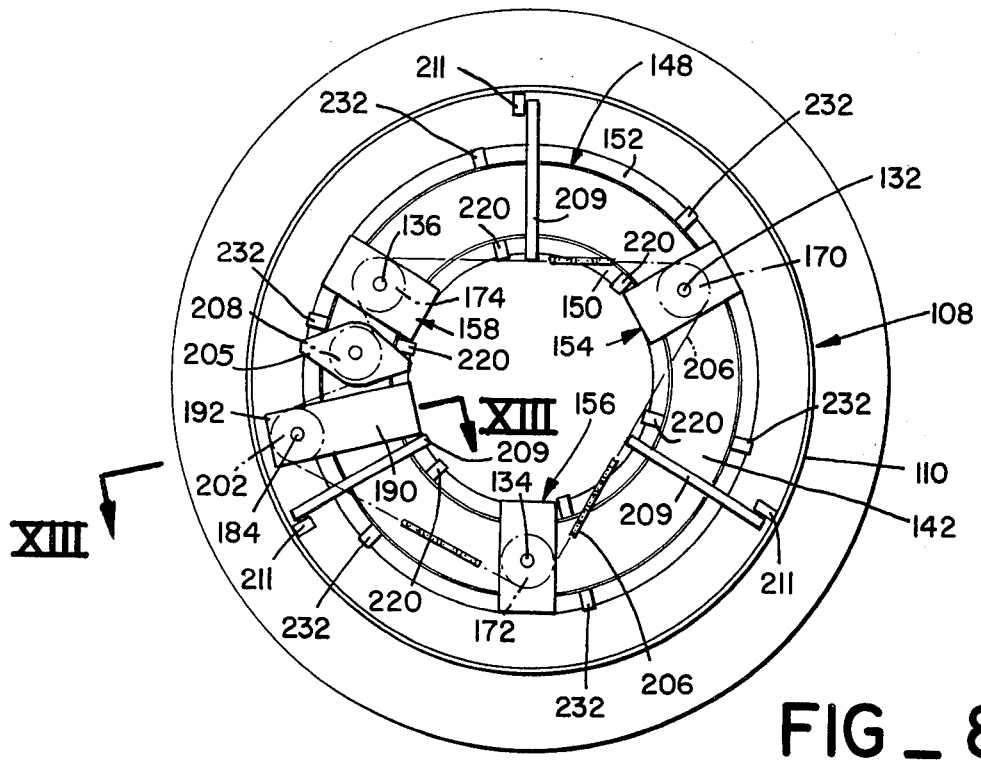
FIG_8

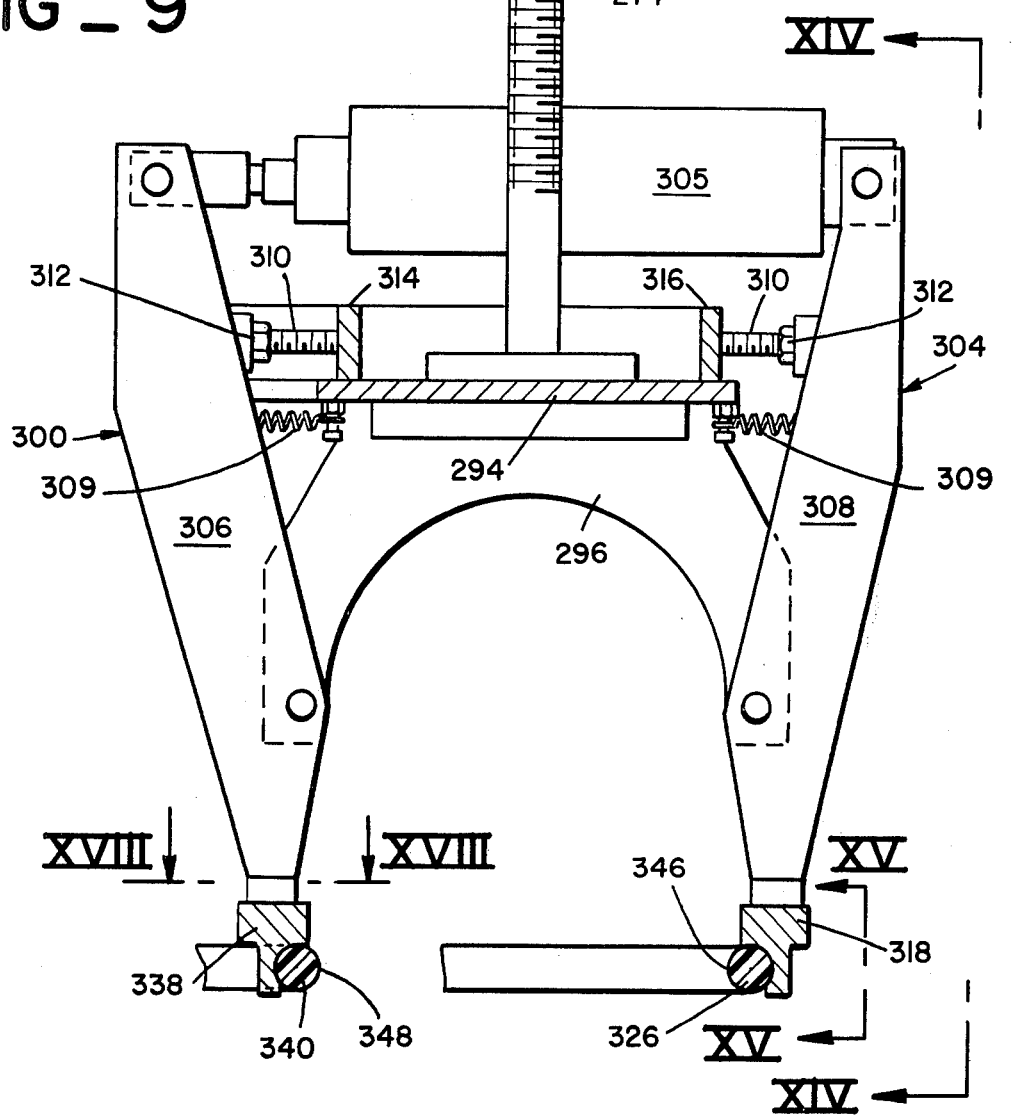

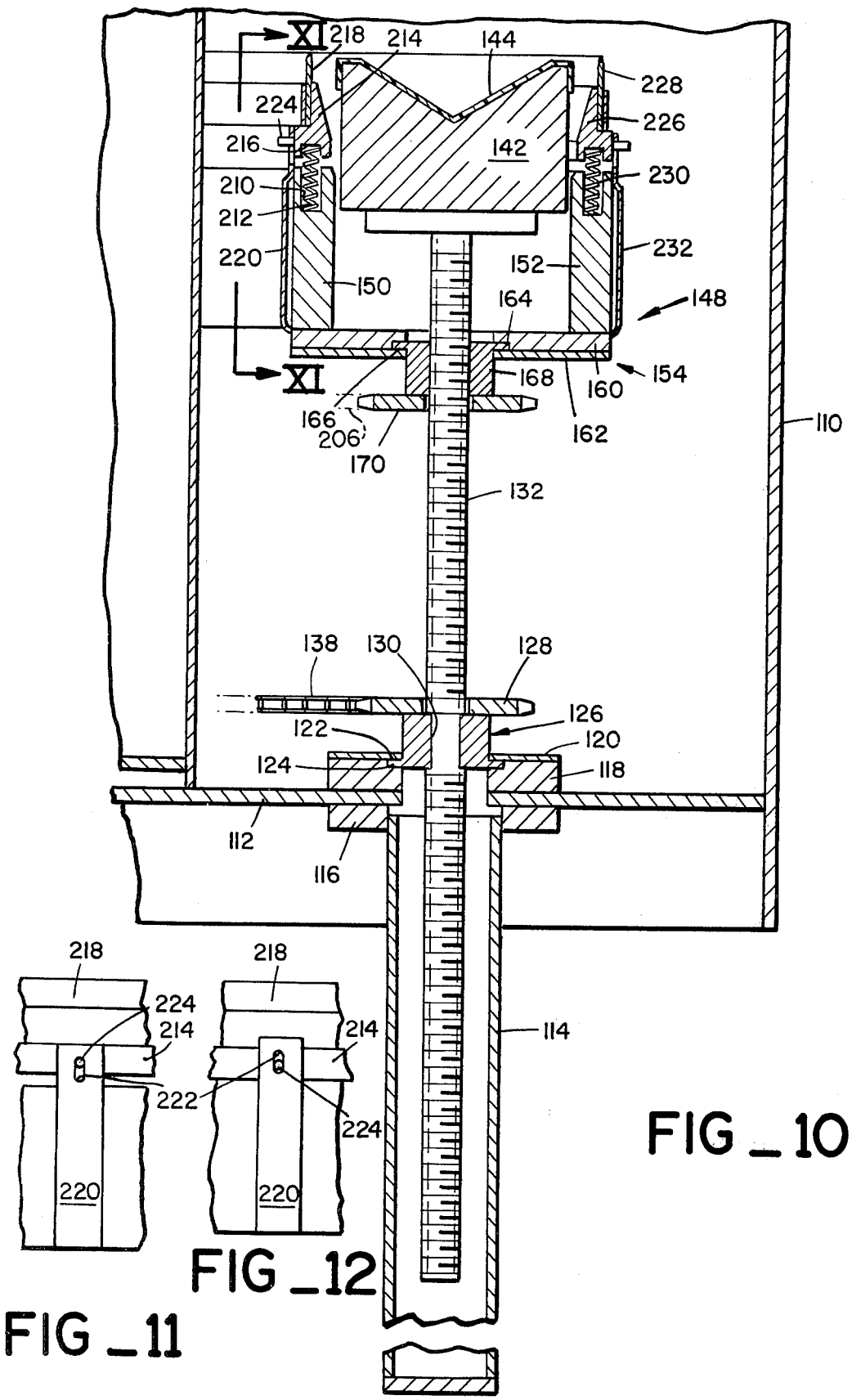
FIG_10
FIG_11
FIG_12

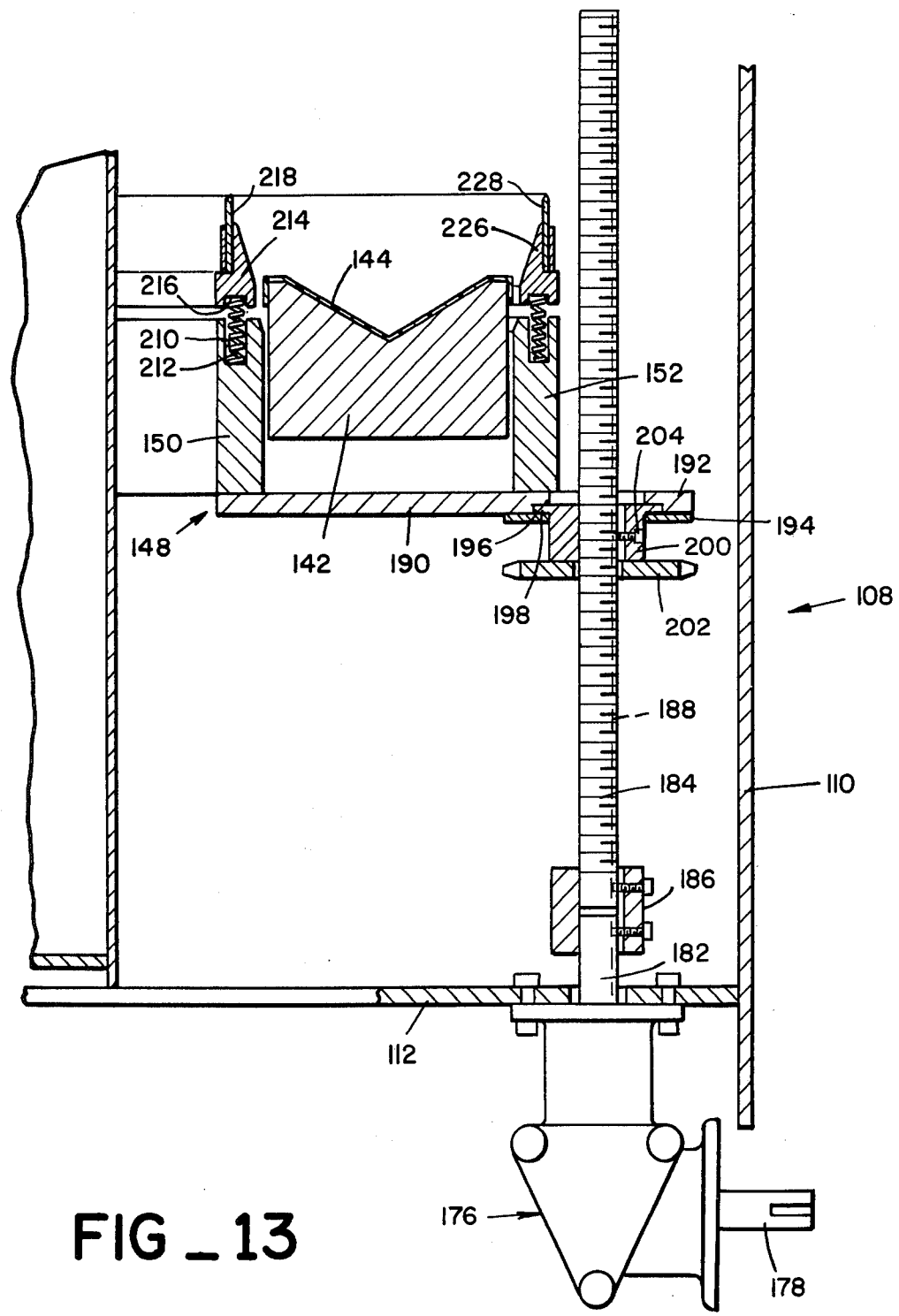
FIG_13

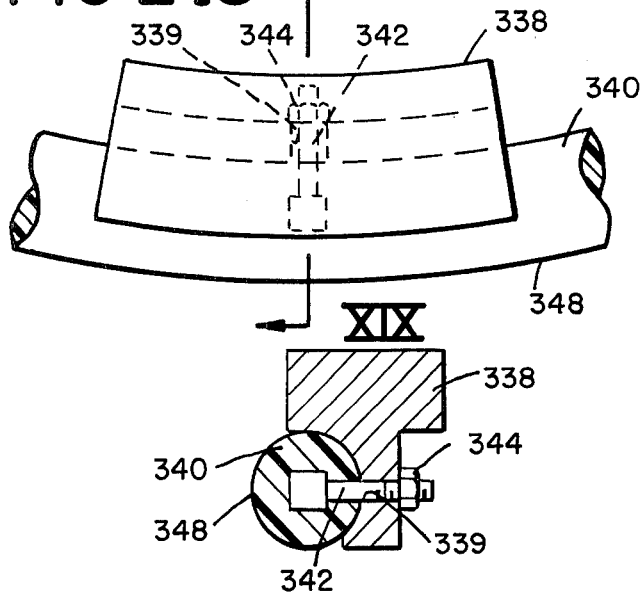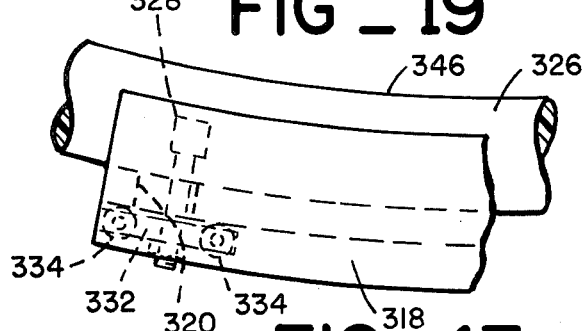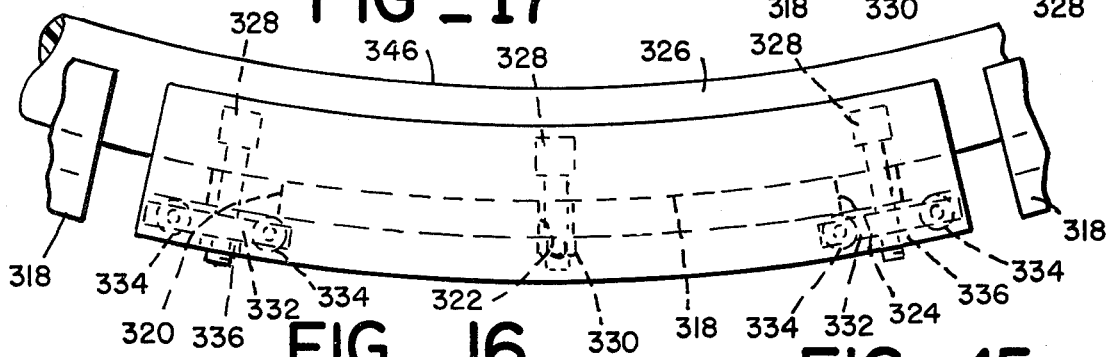

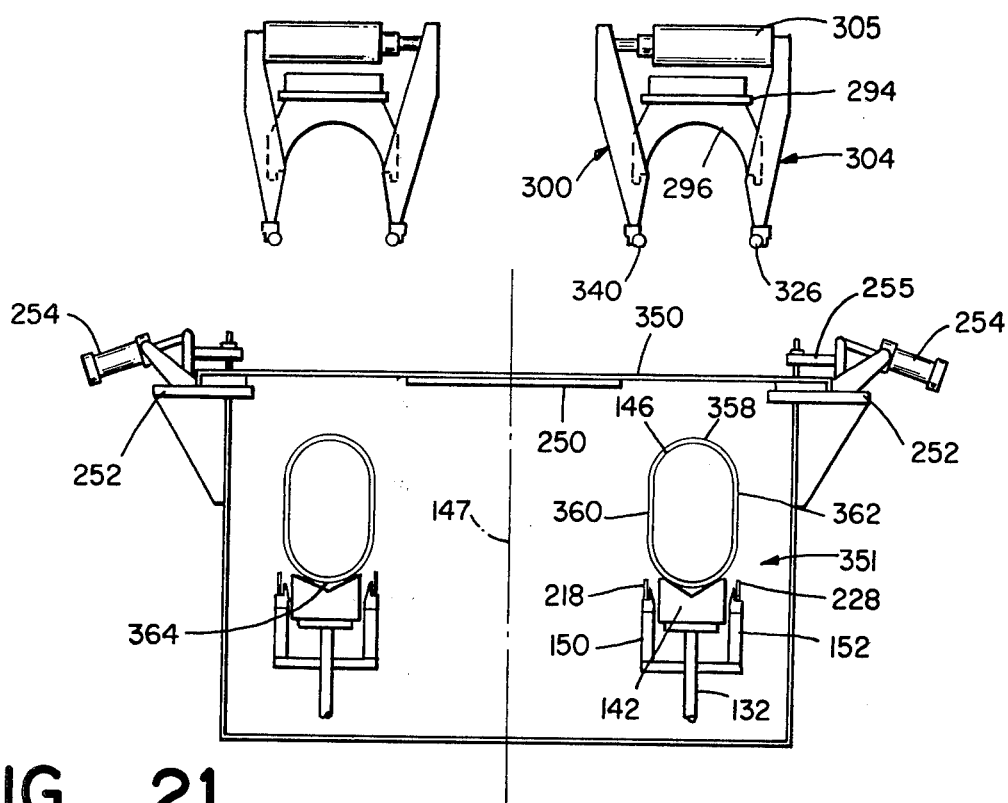
FIG_21
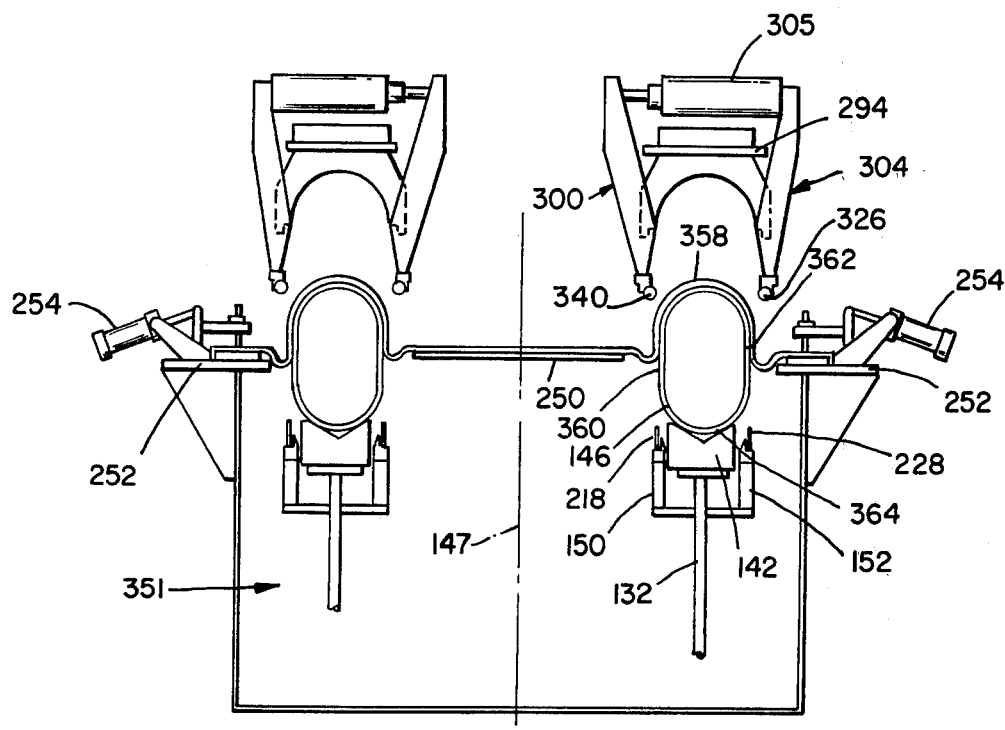
FIG_22

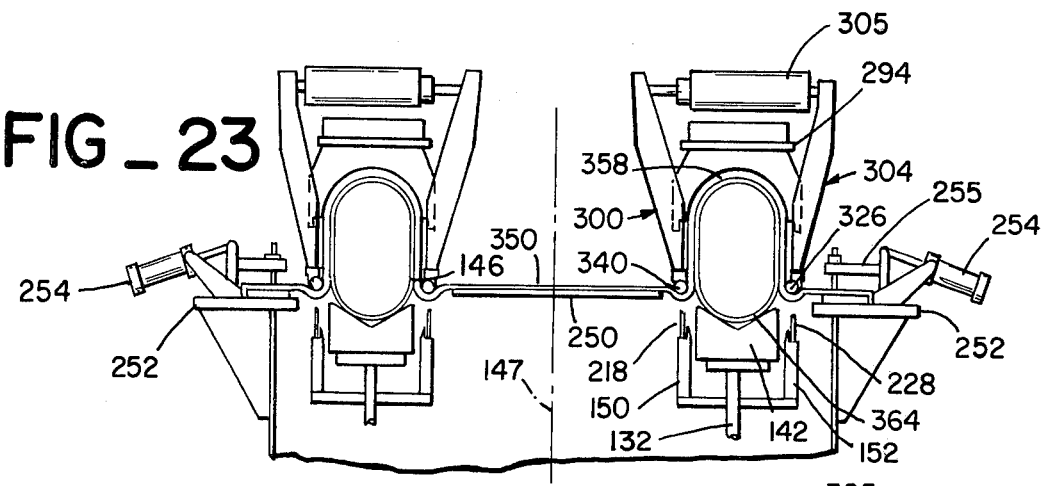
FIG_23
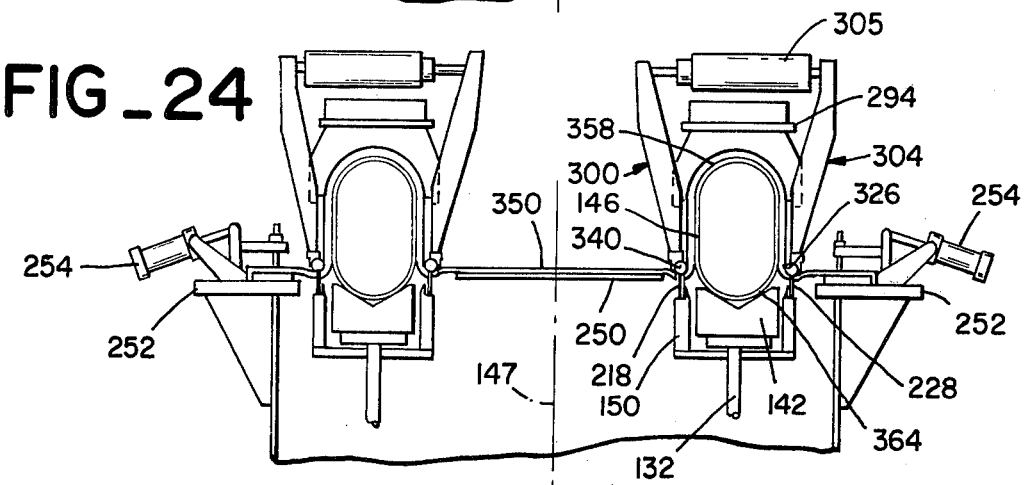
FIG_24
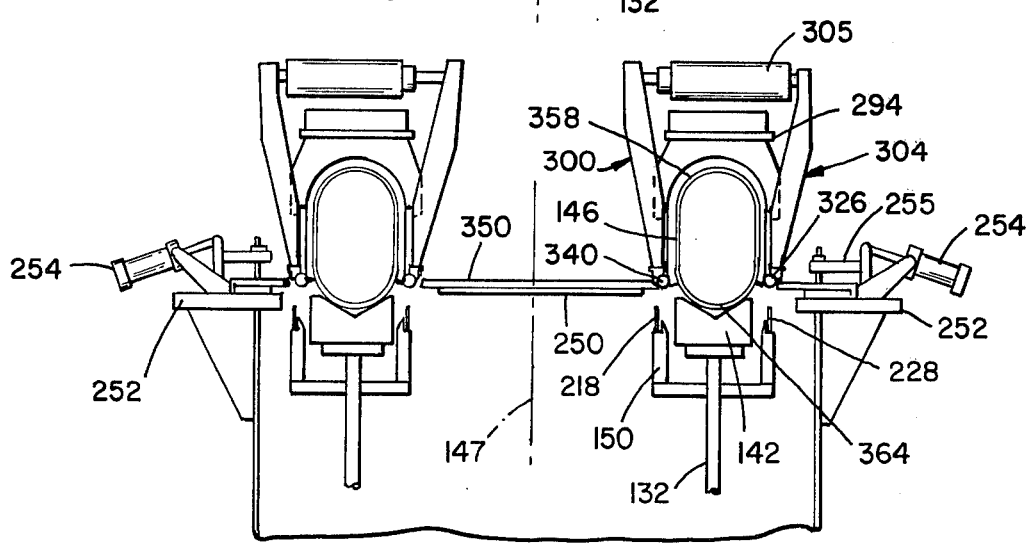
FIG_25

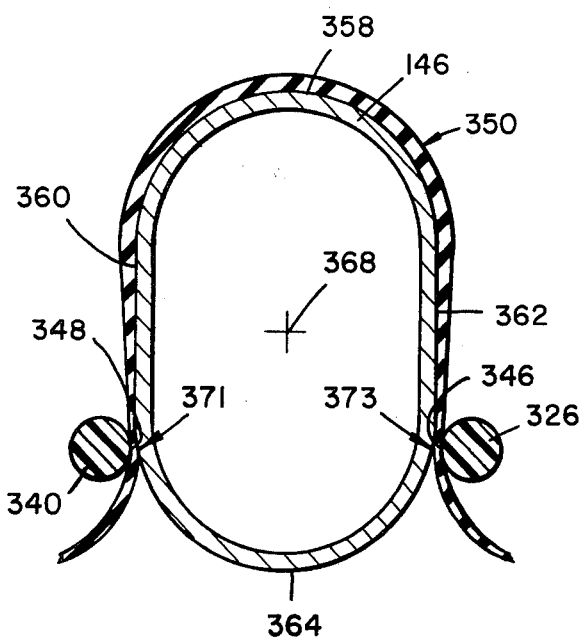
FIG_26
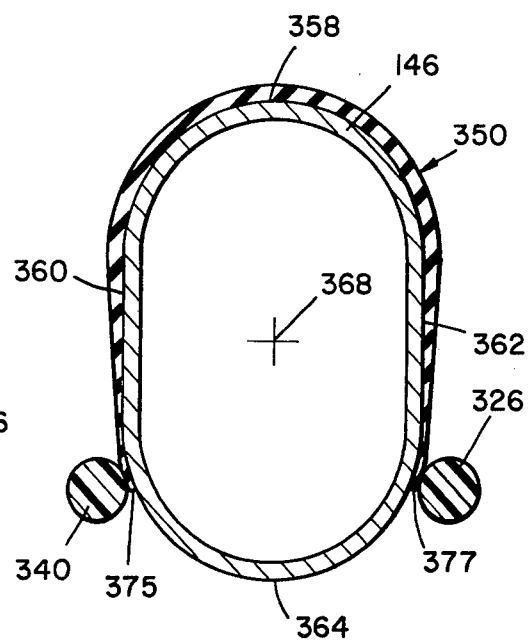
FIG_27
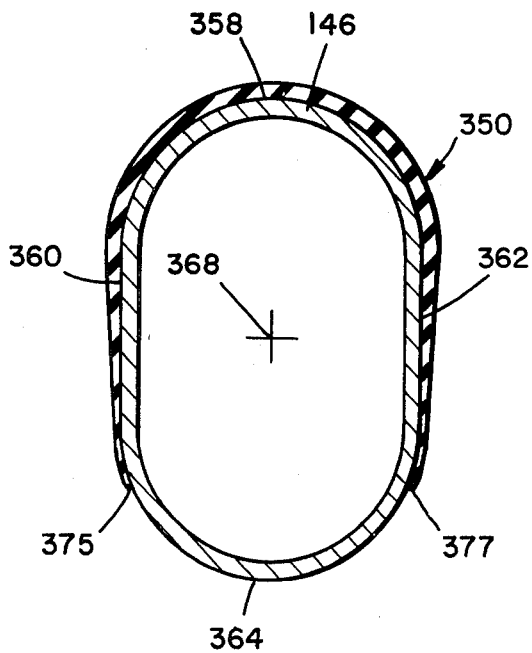
FIG_28
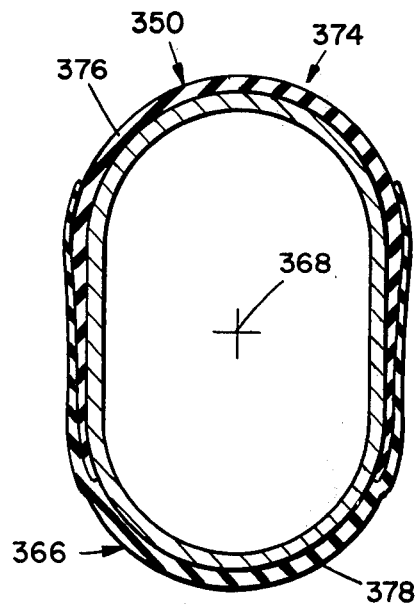
FIG_29

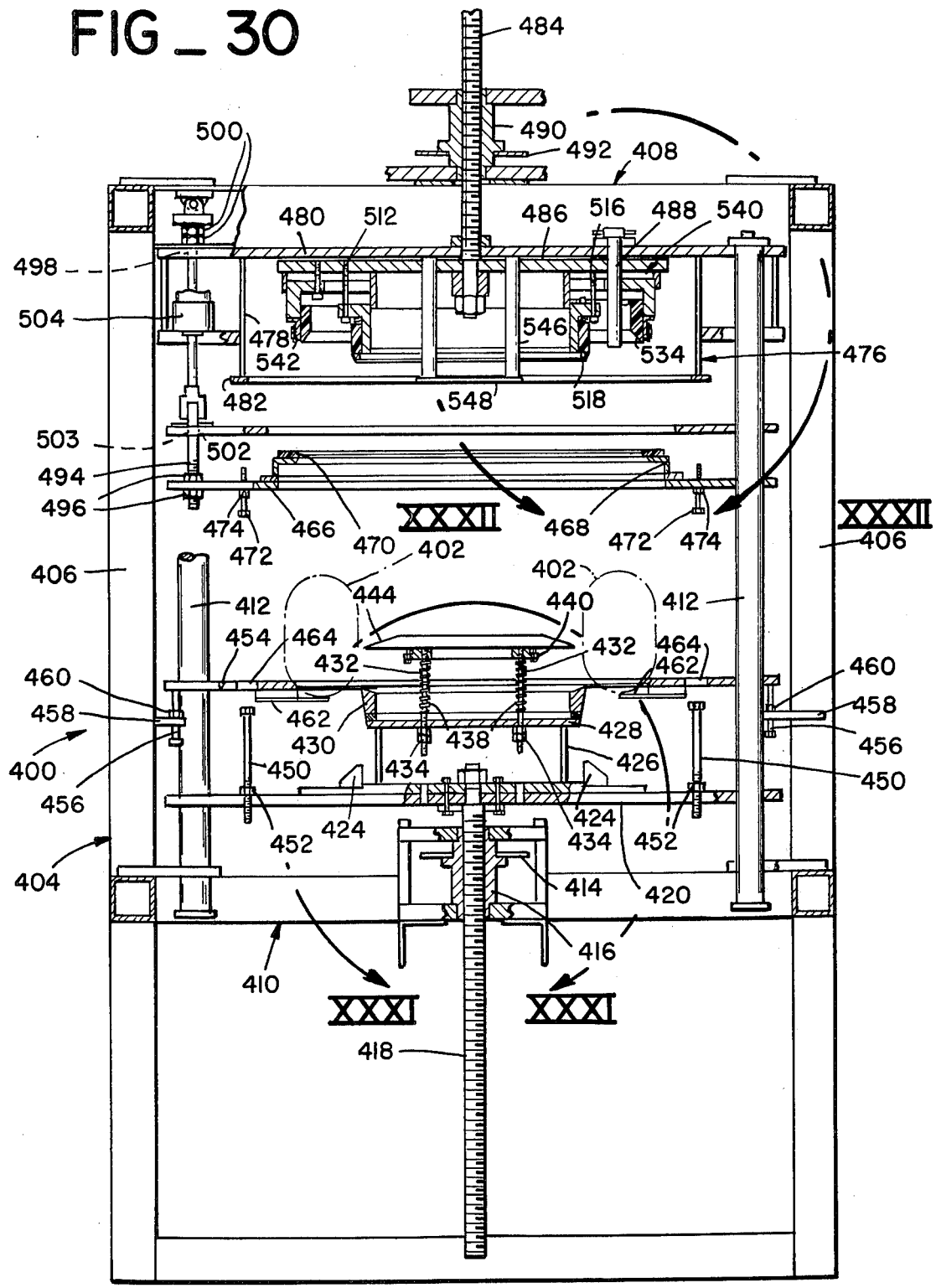

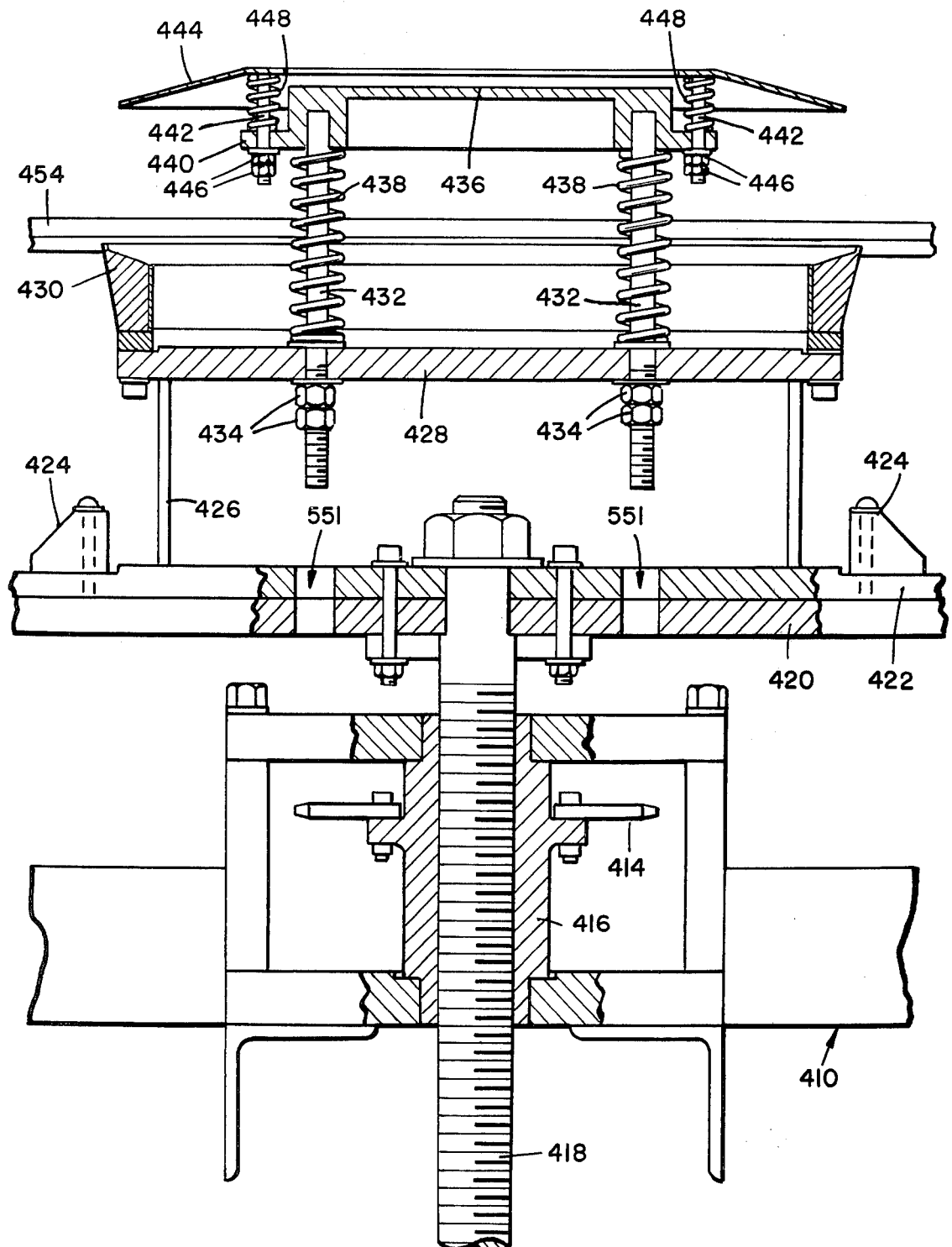
FIG_31

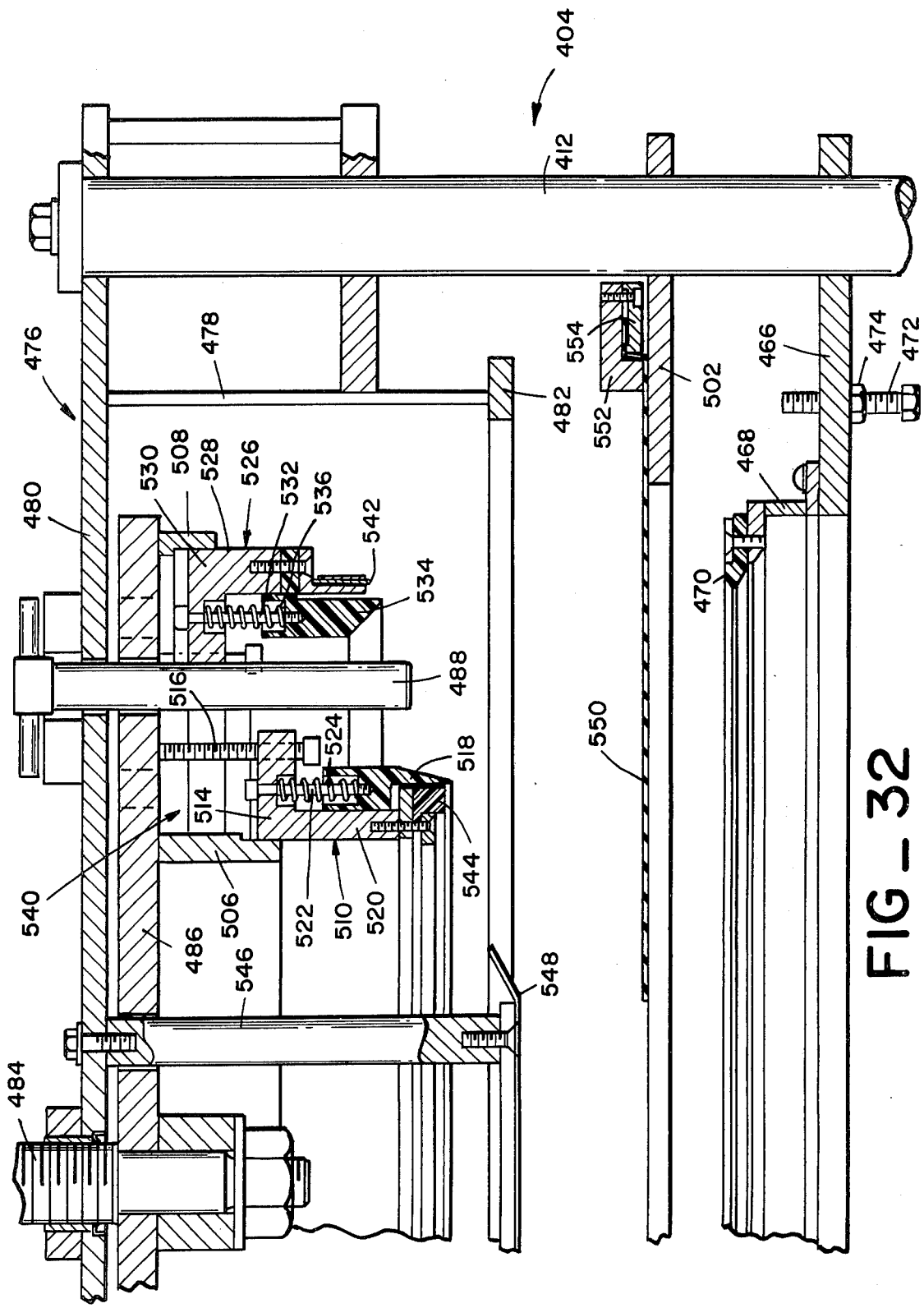

TWO PIECE INNER TUBE

CROSS REFERENCE TO RELATED APPLICATIONS

This application is a divisional application of application Ser. No. 588,732, filed June 20, 1975, now U.S. Pat. No. 4,044,085, which is a continuation-in-part application of application Ser. No. 385,956, filed Aug. 6, 1973, now abandoned.

BACKGROUND OF THE INVENTION

This invention relates to apparatus and method for applying elastomeric material to a core, and more particularly, to such apparatus and method in which elastomeric material is applied to opposite sides of a toroidal core.

U.S. Pat. No. 3,606,921 issued to Grawey (assigned to the assignee of this application) discloses a novel, oval pneumatic tube-tire. Such tire is generally constructed by forming an oval, torodial tube member of elastomeric material on a disintegrable core, winding inextensible filament about the toroidal tube member, and applying further layers of material to form the final tube-tire as illustrated therein. The core is then disintegrated and removed from within the tube-tire.

Of particular importance in the manufacture of such tire as disclosed in that patent is the proper formation of the oval, toroidal tube member on the disintegrable core, in preparation for the wrapping of filament material thereabout. Obviously, the method and the apparatus for practicing such method should be as simple and effective as possible, especially considering that the core which is used may be extremely heavy and large.

While the method of forming the tube by means of wrapping tape about the core has proved to be relatively effective, it will be understood that such wrapping is a relatively time-consuming operation, and must be done with extreme care so as to prepare a proper surface for the wrapping of wire thereon. Even if such operation is undertaken with great care, the lap marks which result from the overlapping of such tape material being wrapped are a hindrance to the proper wrapping of the wire thereon, it being evident that the presentation of a smooth tube surface to the wire to be wrapped thereon is preferable.

It will also be understood that in certain applications, an annular strip of elastomeric material is to be applied to each side of the core, actually being applied to elastomeric material already applied to the core, and forming a part of the oval, toroidal tube member. While it is understood that such side-wall portions of the toroidal tube member can also be applied by hand, it will be understood that such hand application is a relatively time-consuming operation, and must be done with extreme care so as to properly position such added elastomeric material.

Of interest in this area are U.S. Pat. Nos. 3,608,016 to Loberod et al, 2,953,814 to Mumford, 1,856,694 to De Correvont, 3,159,695 to Behringer, 2,830,818 to Otto, and 3,342,914 to Edwards. However, it will be seen that none of these patents are concerned with application of elastomeric material to a toroidal core. For purposes of the claims in this case, the term "core" is to be understood to mean not only the actual base core of, for example, sand, but also any elastomeric material which has been deposited on such base core. That is, the "core" acted upon in the method and by the apparatus of the claims is to be understood to include not only the base core, but also any elastomeric material already applied to such base core at that point in operation.

SUMMARY OF THE INVENTION

It is accordingly an object of this invention to provide method and apparatus for forming an elastomeric tube or a portion of a tube on a core which results in the tube or tube portion formed thereon having a relatively smooth outer surface.

It is a further object of this invention to provide method and apparatus which, while fulfilling the above object, are capable of being practiced and used to effectively and properly form such elastomeric tube or tube portion, meanwhile being quite simple in design and rapid and effective in use.

It is a still further object of this invention to provide a tube structure which is extremely efficient in design and effective in use, and which may preferably be formed through the practice of such method and apparatus.

Broadly stated, disclosed herein is a method of forming a portion of a tube on a toroidal core comprising the steps of positioning a sheet of elastomeric material adjacent the toroidal core along one side thereof, depositing elastomeric material of the sheet thereof onto the toroidal core along a continuous path thereof, and applying force to an annular portion of elastomeric material associated with the core to urge the annular portion of elastomeric material against the core, independent of any force to initially deposit elastomeric material of the sheet onto the core along the continuous path thereof.

Broadly stated, the invention comprises apparatus for forming a portion of a tube on a toroidal core from elastomeric sheet material. Such apparatus comprises frame means, support means operatively associated with the frame means for supporting a toroidal core, and means operatively associated with the frame means for positioning and supporting a sheet of elastomeric material adjacent a so-supported core along one side of the so-supported core. Further included are means for depositing elastomeric material of the sheet thereof onto the so-supported toroidal core along a continuous path thereof. Further included are means for selectively applying force to an annular portion of the elastomeric material associated with the core to urge an annular portion of elastomeric material against the so-supported core.

Broadly stated, the invention also comprises a toroidal tube structure comprising a first tube portion defining a side portion and inner and outer peripheral portions, and a second tube portion defining a side portion and inner and outer peripheral portions overlapping to an extent the respective inner and outer peripheral portions of the first tube portion.

BRIEF DESCRIPTION OF THE DRAWINGS

These and other objects of the invention will become apparent from a study of the following specification and drawings, in which:

FIG. 1 is a sectional side elevation of a first embodiment of the apparatus, showing the formation of one portion of the tube on the core;

FIG. 2 is a view taken along the line II—II of FIG. 1;

FIG. 3 is a view similar to that shown in FIG. 1 but showing the formation of another portion of the tube on the core;

FIG. 4 is an enlarged sectional view of the two halves of the tube shown as formed on the core by means of the first embodiment of apparatus;

FIG. 5 is a view similar to that shown in FIGS. 1 and 3, illustrating the stitching operation carried out on the formed tube;

FIG. 6 is a side elevation, partially in section, of a second embodiment of apparatus;

FIG. 7 is a plan view of the apparatus shown in FIG. 6;

FIG. 8 is a sectional view taken along the line VIII—VIII of FIG. 6;

FIG. 9 is an enlarged view of a portion IX—IX of FIG. 6;

FIG. 10 is an enlarged view of a portion X—X of FIG. 6;

FIG. 11 is a view taken along the line XI—XI of FIG. 10, showing knife element thereof in its upward position relative to the mounting means thereof;

FIG. 12 is a view similar to that shown in FIG. 11, but with the knife element shown therein in its downward position relative to the mounting means thereof;

FIG. 13 is a sectional view taken along the line XIII—XIII of FIG. 8;

FIG. 14 is a view taken along the line XIV—XIV of FIG. 9;

FIG. 15 is a view taken along the line XV—XV of FIG. 9;

FIG. 16 is a view taken along the line XVI—XVI of FIG. 15;

FIG. 17 is a view of a portion of the structure shown in FIG. 16, but showing a roller means relatively shifted in position;

FIG. 18 is a view taken along the line XVIII—XVIII of FIG. 9;

FIG. 19 is a sectional view taken along the line XIX—XIX of FIG. 18; FIG. 20 is an enlarged sectional view of the area XX—XX of FIG. 6;

FIGS. 21-25 are a series of schematic side elevations of the second embodiment of apparatus, showing the sequential steps of operation thereof;

FIG. 26 is a sectional view of the body of the core, taken across the annular axis of the toroidal core, and showing a step in the process of applying elastomeric material to the core;

FIG. 27 is a view similar to that shown in FIG. 26, but showing a further step of applying elastomeric material to the core;

FIG. 28 is a view similar to that shown in FIG. 27, but showing elastomeric material applied to the core;

FIG. 29 is a view similar to that shown in FIG. 28, but showing elastomeric material deposited on the core to form a tube of elastomeric material;

FIG. 30 is a side view, partially in section, of yet another embodiment of the apparatus;

FIG. 31 is an enlarged view of the area XXXI—XXXI shown in FIG. 30;

FIG. 32 is an enlarged view of the area XXXII—XXXII of FIG. 30; and

DESCRIPTION OF THE PREFERRED EMBODIMENTS

Figure 33:
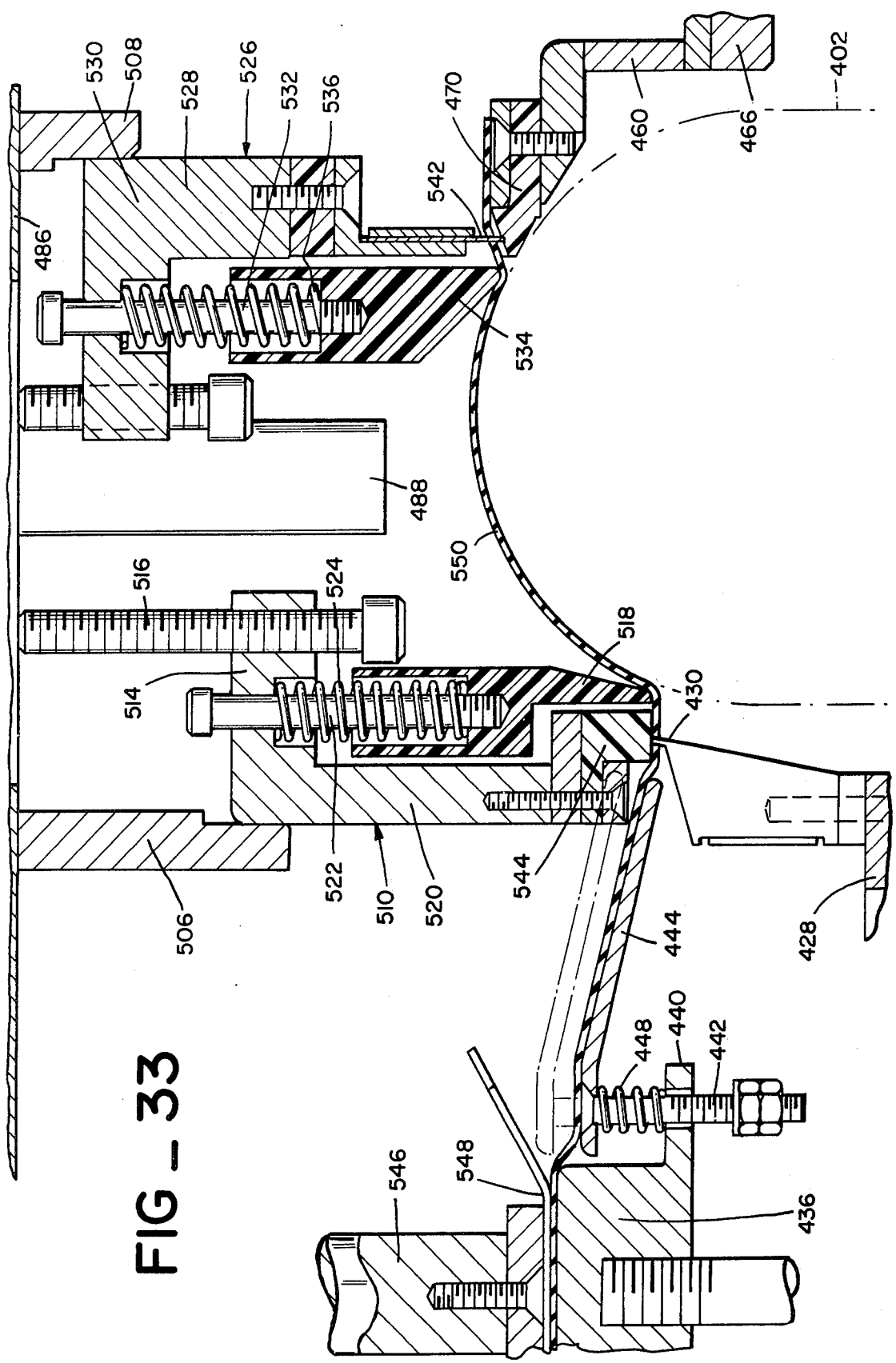
FIG. 33 is a view generally similar to that shown in FIG. 32, but showing elastomeric material deposited on the core.

Shown in FIG. 1 is a toroidal sand core 10 which rests on support means 12, which may be, for example, a series of spaced blocks with individual concave upper surfaces to conform to the core shape, or a circular member which supports the core for a full 360°. Support means 12 attach to a circular plate 14 supported on a fixture 15 that is connected to a power mechanism, the purpose of which is to raise and lower core 10, support means 12, and plate 14.

With the positioning of elements as shown in FIGS. 1 and 3, an annular ring 16 is disposed about the outer periphery of the core 10 and spaced therefrom. Such annular ring 16 is fixed to a circular base plate 18. The plate 14 rests on an annular seal 20 fixed to a circular base plate 18 along the inner periphery thereof. A ring plate 22 has its outer periphery fixed to and in contact with the annular ring 16 and extends inwardly thereof. A disc 24 is fixed relative to and supported above the plate 14 by means of support rods 25. The ring plate 22 and disc 24 define a plurality of apertures 26 therethrough as shown. With the core 10 and plate so positioned as shown, the ring plate 22 and disc 24 lie generally in the mid-circumferential plane of the toroidal core 10. With such positioning, the outer periphery of the core 10 is in close proximity to the inner periphery of the ring plate 22, and the outer periphery of the disc 24 is in close proximity to the inner periphery of the core 10.

In preparing to form a portion of a tube on the core 10, a length of uncured elastomeric sheet material 28, such as rubber, is pulled from a roll 30 and positioned along a flange portion 32 defined by the annular ring 16 in a manner to close and seal the opening of a chamber 33 now defined by the sheet member 28, the annular ring 16, the base plate 18, the seal 20, and the plate 14. The flange portion 32 of the annular ring 16 positions and supports such sheet of elastomeric material 28.

The sheet portion so supported is positioned generally along and parallel to the mid-circumferential plane of the core 10. As rubber is pulled from the roll 30, the separator sheet 34 separating the layers of rubber on the roll 30 is removed and wound on a take-up reel 36. The reel 36 could to its advantage be spring-loaded or motor powered through the use of a slipping clutch arrangement to keep the sheet 34 taut as it comes off the roll 30, but without exerting sufficient force to break the sheet 34.

At this point, a vacuum is drawn through a conduit 38, which communicates with the chamber 33, to apply a pressure differential to the sheet 28. That is, a vacuum is applied to the side of the sheet 28 facing the core 10, and the side of the sheet 28 facing away from the core 10 is exposed to atmospheric pressure. Through such pressure differential, the sheet 28, adhered to the flange portion 32 defined by annular ring 16, is stretched and drawn downwardly so that a portion of the sheet 28 is deposited on the core 10. The disc 24 and ring plate 22 limit the area of the core 10 on which the sheet 28 is deposited, so that the deposited material extends continuously along the inner and outer peripheries of the core 10 a small amount past the mid-circumferential plane of the core 10.

The core 10 may with advantage be of porous material, so that the vacuum is applied to the sheet material 28 deposited on the core 10 through the porous core, pulling the sheet material 28 into tight contact with the core 10.

While the sheet material is held by the vacuum in the position shown, cutter 40 is moved into position by a control mechanism. After cutter 40, including inner and outer cutting members 42,44, is properly positioned above the core 10, it is lowered to cut the portions of the sheet 28 not disposed on the core 10 away from the portion deposited on the core 10. After the cutter 40 is removed from the core 10, the severed portions of sheet material may be removed, leaving only the deposited and formed portion.

After forming of such portion, the core 10 is elevated to the position shown in FIG. 5 and a hoist can be moved into position to permit the core 10 to be lifted and inverted to position the uncovered portion of the core 10 upwardly. The power mechanism can then be used to lower the core 10 to the position shown in FIG. 3.

Elastomeric sheet material 46 is then applied to the uncovered portion of the core 10 through the vacuum means in the same manner as previously described. A portion of the second sheet of material 46 deposited on the core 10 extends continuously a small amount past the mid-circumferential plane of the core 10 and continuously overlaps the portion already deposited continuously along the inner and outer peripheries of the core 10. The material not deposited is removed as previously described.

At this point, the overlapping of the portions result in thick sections which should be flowed into a smoothly blended joint with a secure bond, and without sharp angular edges which may be left by the cutting operation. To accomplish this, a stitching operation is carried out by apparatus 48 as shown in FIG. 5.

A control device capable of producing vertical, horizontal and rotary motion is connected through a shaft 50 to a fixture arm 52. A pair of shafts 54,56 are pivotally supported on a fixture arm 52 through pivots. A stitching roller 58 is rotatably attached to the lower or free end of each shaft 54,56. A loading device 60 is connected between the shafts 54,56 and is functional to establish motion about the pivots to move rollers 58, either away or toward each other. Thus, rollers 58 and shafts 54,56 can be controlled to exert an inward force on an object positioned between the rollers 58, or can be moved outwardly to release the object.

With both tube portions formed and trimmed through the cutting means 40, the lift mechanism can be used to elevate the plate 14, and this core 10, to the position shown. The control is then used to position shaft 50 at the center point of the core 10, and with rollers 58 positioned away from each other by device 60, shaft 50 and arm 52 are lowered to the position shown. This positioning orients arm 52 and shafts 54,56 properly with respect to core 10, such that the loading device 60 can be used to urge shafts 54,56 toward each other.

The rollers 58 are brought into flush contact with the overlapping portions of the deposited sheet material with the shafts 54,56 vertical and parallel. The device 60 can then be adjusted to exert the desired force on the overlapping portions for the stitching operation and the shaft 50 rotated to stitch the overlapping portions or seams simultaneously. This causes the uncured rubber at the overlapping portions to flow into a smoothly blended joint with a complete bond between the portions.

Loading device 60 and the control are then actuated to release the rollers 58 and elevate and rotate shaft 50 to remove the stitching apparatus from the core 10.

After such stitching operation is accomplished, the core and tube formed thereon may be removed to a waiting station or to apparatus for further application of material in, for example, the case of the tube-tire disclosed in U.S. Pat. No. 3,606,921 mentioned above, or to a curing mold if a basic tube is being fabricated.

It will be understood, of course, that other embodiments of the invention are possible. For example, it will be seen that the core 10 could be supported with its mid-circumferential plane disposed vetically. It will also be understood that the cutting means for cutting the portions of sheets not deposited on the core could take a variety of configurations. Obviously, the problems created by forming the tube of overlapping elastomeric tape are completely avoided through this invention.

Shown in FIGS. 6-9 is a second embodiment of apparatus 100 for forming a portion of a tube on a toroidal core. Such apparatus 100 includes frame means 102 including a base portion 104 further including upwardly extending legs 106, to which is fixed a body 108 including a cylindrical sidewall portion 110 and a lower portion 112, fixed to and within the cylindrical sidewall portion 110. The lower portion 112 has fixed thereto and extending downwardly therefrom three socket portions 114, one of which is best shown in FIGS. 6 and 10, and each socket portion 114 has associated therewith similar structure also shown most clearly in FIGS. 6 and 10. Consequently, the detailed structure of only one of these assemblies will be described.

The lower portion 112 has fixed to the lower surface thereof a plate 116, and the upper end of the socket portion 114 is fixed to the inner periphery of the plate 116. The lower portion 112 has fixed to the upper surface thereof a plate 118, which in turn has fixed to the upper surface thereof a washer 120. The plate 118 and washer 120 together define an annular channel 122 in which is seated a radial portion 124 of a hub 126, to which a sprocket 128 is fixedly secured. The inner bore 130 of the hub 126 has threads formed therein, which engage with the outer threads of an elongated shaft 132, the lower extended end of which is positioned in the socket portion 114. FIG. 8 shows two similar shafts 134,136 which are associated with the lower portion 112 of the body 108 in a similar manner, having similar hub and sprocket assemblies associated therewith. The shafts 132,134,136 are positioned substantially 120° apart about the body 108. The sprockets associated with shafts 132,134,136, are connected by an endless driving chain 138 (FIGS. 6 and 10), which may be connected in a well-known manner to a wheel 140 through a gear box, or to a motor through such gear box, to drive the chain 138 in one and the other directions to rotate the sprockets including sprocket 128 in one and the other directions to raise and lower the non-rotating shafts 132,134,136. It will thus be seen that through movement of the chain 138, the assembly associated with the upper ends of the shafts 132,134,136 can be selectively raised and lowered.

An annular support member 142 is fixed to the respective upper ends of the shafts 132,134,136. Such annular support member 142 is indented in cross-section as best shown in FIG. 10, and the upper surface has fixed thereto an elastomeric portion 144 on which a toroidal core 146 is to be seated (for example see FIG. 21).

A mounting structure 148 is operatively associated with the upper ends of the threaded shafts 132,134,136. Such mounting structure 148 includes an inner cylindrical mounting wall 150, an outer cylindrical mounting wall 152, spaced apart so that the support member 142 can be disposed therebetween, and plate assemblies 154,156,158 extending between and fixed to the wall 150 and wall 152. The plate assembly 154 is actually made up of a plate 160 fixed to the walls 150,152 and a plate 162 fixed to plate 160, the plates 160,162 together defining an annular channel 164 in which is seated a radial portion 166 of an internally threaded hub 168. Such internally threaded hub 168 has the threads thereof in engagement with the threads of the shaft 132, and the hub 168 also has fixed thereto a sprocket 170. It will be seen that this hub and sprocket assembly 168,170 is rotatable relative to the mounting structure 148.

The plate assemblies 156,158 are associated with the shafts 134,136 respectively in a similar manner, having sprockets 172,174 and hubs associated therewith.

The lower portion 112 has fixed thereto a gear box 176 (FIG. 13), in input shaft 178 of which may be rotated by a handle 180 (FIG. 6) or motor as is well-known, and the output shaft 182 of such gear box 176 connects with an upwardly extending shaft 184 by means of a coupling 186. The shaft 184 is in fact not threaded but has an elongated spline 188 formed therein. Yet another plate 190 interconnects and is fixed to the walls 150,152 (see also FIG. 8). The plate 190 includes an extended portion 192 to which is fixed a plate 194, and the plates 190,194 together define an annular channel 196 in which is seated a radial portion 198 of a hub 200. The hub 200 has fixed thereto a sprocket 202, and the shaft 184 is disposed through central openings of the hub 200 and sprocket 202. A set screw 204 is disposed through a lateral hole in the hub 200, and engages with the spline 188 defined by the shaft 184, so that it will be seen that the rotation of the shaft 184 about its longitudinal axis rotates the sprocket 202, but with the sprocket 202, hub 200, and portion of the mounting structure 148 associated therewith being allowed to move along the longitudinal axis of the shaft 184.

A chain tensioner 205 (FIG. 8) is mounted to the walls 150,152 as a portion of the mounting structure 148, and an endless chain 206 extends about the sprocket 202, about the sprocket 208 of the chain tensioner 205, about the sprocket 174, about the sprocket 170, and about the sprocket 172. It will be seen that rotation of the shaft 184 by means of a handwheel or motor rotates the sprocket 202 to in turn rotate the hub 200 and sprockets 170,172,174 to selectively move the mounting structure 148 upwardly and downwardly along the non-rotating shafts 132,134,136. Guide arms 209 are fixed to the lower surfaces of the walls 150,152 and have guide rollers 211 fixed to their extended ends which bear on the inner surface of the cylindrical sidewall portion 110 of the body 108 to properly position and guide the inner and outer walls 150,152 together during upward and downward movement thereof.

It is to be seen that upon actuation of only chain 138, the support member 142 and mounting structure 148 may be raised or lowered together. Upon actuation of only chain 206, the mounting structure 148 may be raised or lowered relative to the support member 142.

The upper portion of the wall 150 has formed therein a plurality of holes 210 (FIGS. 10 and 13), and disposed in each hole 210 is a spring 212 which extends above the upper surface of the wall 150. An annular knife mounting element 214 is positioned above the upper surface of the wall 150, and defines a plurality of holes 216 in which are seated the upper ends of the respective springs 212. The knife mounting element 214 has fixed thereto an annular knife element 218. The wall 150 has fixed thereto a plurality of guide members 220, each defining an elongated vertical slot 222 in which is slidably disposed a pin 224 fixed to and extending from the knife mounting element 218. The resilience of the spring 212 bearing on the knife mounting element 214 urges the knife mounting element 214 and knife element 218 into an upper position wherein the pins 224 contacts the uppermost surfaces defining the elongated vertical slot 222 (FIG. 11). However, it will be seen that upon application of a generally downward force to the knife element 218, the knife element 218 and knife mounting element 214 will be allowed to move downwardly relative to the wall 150 against the resilience of springs 212 until the pins 224 contact the lower surfaces defining the elongated vertical slots 222 (FIG. 12).

The upper portion of the wall 152 has associated therewith a like annular knife mounting element 226, which in turn has an annular knife element 228 fixed to and extending upwardly therefrom. The upper portion of the wall 152 and the knife mounting element 226 are associated in the same manner as the wall 150 and knife mounting element 214, by means of a plurality of springs 230 and a plurality of guide members 232 for providing that the knife mounting element 226 and knife element 228 may be moved relative to the wall 152 in a similar manner, but with the movement thereof being constrained by the pins and slotted guide members similar to the above.

Fixed to the lower portion of the body 108 within the cylindrical portion 110 is a tank 234 (FIG. 6) which includes a central tubular portion 236 defining a central vertical bore 238 therethrough. The tank 234 may be completely closed off by the insertion of a cap bolt 240, or may be opened by removal of such cap bolt 240. A central shaft 242 is disposed through the tubular bore 238 and through a collar 244 fixed to the lower portion 112. The shaft 242 defines through its lower end a plurality of bores 246, and a pin 248 may be disposed through an appropriate bore in the collar 244 and one of the bores 246 in the shaft 242, to position the shaft 242 relative to the body 108 along the longitudinal axis of the shaft 242. The upper end of the shaft 242 has fixed thereto a circular table portion 250, so that it will be seen that the vertical positioning of the circular table portion 250 relative to the body 108 may be chosen by means of the pin and bore assembly described.

Fixed to the upper surface of the cylindrical portion 112 is an outer annular table portion 252. Such outer annular table portion 252 has fixed thereto about the outer periphery thereof a plurality of hydraulic clamp cylinders 254, the operation of which will be described further on.

The table portion 252 has fixed thereto and upwardly extending therefrom beams 256,258,260 (FIGS. 6 and 7). A cross beam 262 interconnects the beams 256,258, and a beam 264 is fixed to the beam 260 and the central portion of beam 262. Plates 266,268 are fixed to the beam 262, and extend outwardly therefrom in a direction generally opposite the direction of extension of the beam 264 therefrom. The beam 264 has rotatably mounted relative thereto a hub and sprocket assembly 270,272 (FIG. 9) similar to, for example, the hub and sprocket assembly 126,128 rotatably mounted to the lower portion 112. The plates 266,268 have like hub and sprocket assemblies (including sprockets 280,282) rotatably mounted relative thereto. The hubs thereof are internally threaded, and the threads thereof engage with the external threads of respective elongated vertical shafts 274,276,278. It is to be seen that rotation of the sprockets 272,280,282 and hubs therewith moves the non-rotating shafts 274,276,278 vertically. An endless chain 284 is disposed about and in engagement with the sprocket 272, the sprocket 280, the sprocket 282, a tensioning sprocket 286, and a drive sprocket 288 fixed to a plate 290 which is in turn fixed to the cross beam 262. The drive sprocket 288 may be driven by a hand crank 292 or by motor means, as is well-known.

An annular carriage ring 294 (FIGS. 6 and 9) is fixed to the lower extended end of each shaft 274,276,278, and the carriage ring 294 has fixed to the lower surface thereof a plurality of substantially U-shaped members 296. A first plurality 298 of link means 300 are pivotally mounted relative to the carriage ring 294, and a second plurality 302 of link means 304 are pivotally mounted relative to the carriage ring 294. Each of such link means 300 is made up of a pair of links 306 pivotally mounted to an extended end of a U-shaped member 296, and each of such link means 304 is made up of a pair of links 308 pivotally mounted to another extended end of the substantially U-shaped member 296 (see also FIG. 14). Each of the plurality of link means 300 is disposed inwardly of an associated one of the plurality of link means 304 toward the central axis 147 (FIGS. 21-25) of a toroidal 146 positioned upon the support member 142. The upper extended ends of each pair of associated link means 300,304 are connected by a hydraulic cylinder 305, so that extension of such hydraulic cylinder 305 moves the lower extended ends of the associated link means 300,304 together, and retraction of the cylinder 305 moves the lower extended ends of the associated link means 300,304 relatively apart. Biasing springs 309 interconnect each link means 300,304 and the carriage ring 294 to tend to draw the upper ends of the link means 300,304 inwardly toward the carriage ring 294. Inward movement of such upper portions of the link means 300,304 is limited and determined by adjusting studs 310 and nuts 312 mounted to the upper ends of the link means 300,304 and positioned to be brought into contact with inner and outer annular rings 314,316 secured to the carriage ring 294.

Each lower end of a link means 304 has fixed thereto a curved actuator segment 318, and such actuator segments 318 are disposed in substantially circular fashion about the apparatus. Each actuator segment 318 defines three apertures 320,324,322 therethrough, with the central aperture 322 being substantially circular, and the outer apertures 320,324 being elongated in the direction along the longitudinal axis of such actuator segment 318. An elastomeric ring 326 is positioned inwardly of and in contact with these actuator segments 318, and the elastomeric ring 326 has fixed thereto and embedded therein the head portions of bolts 328. Taking three adjacent bolts 328 as a group thereof, the central bolt 328 has an extended portion extending outwardly from the elastomeric ring 326 and through the central aperture 322 of the actuator segment 318, and a nut 330 is secured to the extended end of the central bolt 328 to secure the central portion of the actuator segment 318 to the elastomeric ring 326. The bolts 328 on either side thereof have the extended portions thereof extending outwardly of the elastomeric ring 326 and through the respective elongated apertures 320,324 in the actuator segment 318. Each of the extended ends of these bolts is positioned through an aperture in a body 332 which has a pair of rollers 334 fixed thereto, and a nut 336 is secured on each extended end of such bolts to bring the rollers 334 into contact with the actuator segment 318 and to secure the elastomeric ring 326 to the ends of the actuator segment 318. It is to be understood that the next adjacent group of three bolts 328 associated with the elastomeric ring 326 is associated with another actuator segment 318 in like manner, such actuator segment 318 being in turn secured to the lower extending end of another link means 304, and so forth.

The lower extended end of each link means 300 has fixed thereto a curved actuator segment 338 so that the curved actuator segments 338 together define a substantially circular configuration. Each actuator segment 338 has disposed therethrough an aperture 339, and an elastomeric ring 340 is positioned outwardly of such actuator segments 338. The elastomeric ring 340 has embedded therein the heads of a plurality of bolts 342, and the threaded end of each bolt 342 is disposed through the aperture 339 in a respective actuator segment 338. The elastomeric ring 340 is secured to each actuator segment 338 by a nut 344 threadably engaged with the extended end of a respective bolt 342.

With the hydraulic cylinders 305 in their retracted states, the adjacent ends of the actuator segments 338 are quite close together and the adjacent ends of the actuator segments 318 are substantially one half inch part. Extension of the cylinders 305 pivots each associated pair of link means 300,304 so that the actuator segments 318 move inwardly to move the inner annular surface 346 of the elastomeric ring 326 inwardly, compressing the elastomeric ring 326 along its length during such operation, the gap between associated ends of the actuator segments 318 allowing such compression and movement. At the same time, the annular ring 340 is placed under tension and elongated to move the outer annular surface 348 thereof outwardly toward the elastomeric ring 326.

As set forth above, it will be seen that upon actuation of the motor means to drive the chain 284, the entire assembly including the carriage ring 294, substantially U-shaped members 296, link means 300,304, cylinders 305, actuator segments 318, actuator segments 338, and elastomeric rings 326, 340 can be raised and lowered at the desire of the machine operator.

In the use of the apparatus 100, a toroidal core 146 is disposed on the support member 142 and seated in the recessed area thereof. It will be noted that with such toroidal core 146 so positioned, the central axis 147 of the core 146 coincides with the central axes of the elastomeric rings 326,340, and the central axis of the carriage ring 294, and also the central axes of the annular knife elements 218, 228. A circular sheet of elastomeric material 350 has its outer periphery fitted between a pair of rings 352, 353, the rings 352, 353 defining complimentary step portions 354, 356, which properly seat and hold the elastomeric material therebetween (see FIG. 20), for securing the outer periphery of such elastomeric sheet material 350 relative to such rings 352, 353. The rings 352, 353 with the elastomeric sheet material 350 are fitted on the outer annular table portion 252, and the hydraulic clamp cylinders 254 are actuated to bring the raisable and lowerable clamping arms 255 thereof into contact with the upper ring 352 to press the ring assembly into contact with the table portion 252. In such state, the toroidal core 146 is disposed below the lower surface of the sheet material 350, and the elastomeric rings 326, 340 are in a raised position (FIG. 21). The table portions 252, 250 act as means associated with the frame means for positioning and supporting the sheet of elastomeric material 350 adjacent the so-supported core 146 along one side of the so-supported core 146.

With such elastomeric sheet material 350 in position, the sheet material 350, cylindrical portion 110, lower portion 112, and tank 234 (with cap bolt 240 removed) together form a closed chamber 349 (represented in simplified form in FIGS. 21–25). Liquid such as water 347 may be previously selectively added to or removed from the tank 234 to selectively vary the volume of closed air chamber 351 within such overall closed chamber 349. The chain 138 is then driven to raise the shafts 132,134,136 to in turn raise the support member 142 and the core 146 thereon to contact with the lower surface of the elastomeric sheet material 350. During such movement, it will be understood that the sheet of elastomeric material 350 is supported by the rings 352,353 on table portion 252 about the outer edge of the sheet of elastomeric material 350 outwardly of the outer periphery 362 of the toroidal core 146, and that the sheet of elastomeric material 350 is supported by the table portion 250 adjacent the center portion thereof inwardly of the inner periphery 360 of the core 146. Upon further upward movement of the core 146, the effective volume of the air chamber 351 increases due to the movement of the elastomeric material 350, tending to draw the elastomeric material 350 inward of the table portion 252 and outward of the table portion 250 downwardly into such air chamber 351 (FIG. 22). The further upward movement of the core 146 further increases the air chamber size, further increasing the amount of pressure differential within the air chamber 351 and outside the air chamber, i.e., between the side of the sheet of elastomeric material 350 facing the core 146 and the side of the sheet of elastomeric material 350 facing away from the core 146. Through such movement, elastomeric material of the sheet 350 is deposited onto the toroidal core 146 along a continuous path thereof, covering a side thereof. As best shown in FIG. 26, because of the increasing vacuum within the air chamber described above, in turn due to the increasing air chamber size, the elastomeric material 350 is applied to the core 146 in a particular manner. That is, elastomeric sheet material 350 is applied along one side 358 of the core 146, and along the inner and outer peripheries 360,362 of the core 146 to adjacent the opposite side 364 of the core 146. Due to such increasing chamber size and vacuum applied to the lower side of the sheet material 350 during movement of the core 146, and the stretching of elastomeric material yet to be deposited on the core 146, the elastomeric material 350 applied to the inner periphery 360 of the core 146 continuously decreases in thickness in the direction away from the one side 358 of the core 146, and that applied to the outer periphery 362 of the core 146 is of continuous decreasing in thickness in the direction away from the one side 358 of the core 146. The positioning of the table portion 252 and table portion 250 may selectively be varied, i.e., for example through the raising and lowering of the table portion 250 by means of the pin and collar structure described above, to vary the depositing characteristics during this operation.

The elastomeric rings 326,340 are lowered through actuation of the chain 284, (having been partially lowered during the initial raising of the core 146), with the elastomeric rings 326,340 in their outward positions through the full contraction of the cylinders 305. The cylinders 305 are then extended and the continuous annular surface 348 of the elastomeric ring 340 is brought into contact with elastomeric material 350 deposited on the core 146 to stitch or apply force to an annular portion of the elastomeric material 350 deposited on the core 146 adjacent a continuous annular edge 371 of the so-deposited material to urge such annular portion against the core 146 (FIGS. 23 and 26). Such forcing is independent of any force used to initially deposit the elastomeric material 350 of said sheet against the core 146, such initial depositing taking place through the vacuum process described above. The continuous annular surface 346 of the elastomeric ring 326 is simultaneously brought into contact with a second annular portion of elastomeric material 350 deposited on the core 146 adjacent another continuous edge 373 of the so-deposited material 350 through pivoting of the link means 304, to stitch or apply force to this annular portion of elastomeric material 350 against the core 146, also independent of any force used to initially deposit elastomeric material 350 against the core 146.

The force applied by the annular surface 346 of elastomeric ring 326 and the force applied by the annular surface 348 of elastomeric ring 340 are applied adjacent the continuous edges 373,371 of the so-deposited elastomeric material 350. In fact, the force applied by the annular surface 346 of elastomeric ring 326 is applied to an annular portion of elastomeric material 350 which has been applied to the outer periphery 362 of the core 146. The force applied by the annular surface 348 of the ring 340 is applied to an annular portion of elastomeric material 350 which has been applied to the inner periphery 360 of the core 146.

As set forth above, during outward movement of the elastomeric ring 340, such elastomeric ring 340 is placed in tension due to the movement of the actuator segments 338 relatively apart. The elastomeric ring 326 is placed in compression, due to the movement of the actuator segments 318 relatively together. The elongated apertures 320,324 defined by the actuator segments 318 described above allow movement of the extended ends of the associated bolts 328 relative thereto, to allow proper compression of the elastomeric ring 326 along its length. It will also be understood that in a subsequent step to be described, such elongated apertures 320,324 will allow the proper removal of the elastomeric ring 326 from the core 146 upon pivoting of the actuator segments 318 outwardly.

To this point, the annular knife elements 218,228, adjacent the inner and outer peripheries of the core 146 respectively have been held in their lower position relative to the core 146 through proper actuation of the chain 206. At this point, with the continuous annular surfaces 346,348 of the rings 326,340 in contact with elastomeric material 350 on the core 146, the knife elements 218,228, which may be of the heated type to provide efficient cutting, are raised through actuation of the chain 206 to rotate the sprockets 170,172,174, to move the mounting structure 148 toward the core 146 to raise the knife elements 218,228 into contact with elastomeric material 350 not deposited on the core 146 to press the knife-element-contacted portions of elastomeric material 350 against the elastomeric rings 340,326 respectively (FIG. 24).

As set forth above, the mounting structure 148 is movably mounted relative to the support member 142 so that it may be moved relatively toward and away from the so-supported core 146. The slotted guide members 220,232 allow movement of the knife elements 218,228 relative to the mounting structure 148 relatively toward and away from the so-supported core 146, and the resilient springs 212,230 urge the knife elements 218,228 relatively toward the so-supported core 146.

During the cutting operation, it will be seen that with the knife elements 218,228 brought into contact with elastomeric material to be cut, the springs 212,230 allow such knife elements 218,228 to be moved downwardly so as not to apply too great a force to the elastomeric rings 340,326 against which the cutting is done. Upon lowering of the walls 150,152, the springs 212,230 urge the knife elements 218,228 back into their normal upward positions, and the guide members 220,232 and particularly the slots therein provide for particularly proper positioning of the knife elements 218,228, meanwhile allowing for such movement against the urging of the springs 212,230.

The step of cutting away elastomeric material 350 not deposited on the core 146 takes place adjacent and about the continuous edges 371,373 of the so-deposited elastomeric material 350. Subsequent to such cutting step, the knife elements 218,228 are lowered through actuation of the chain 206, the cylinders 305 are retracted and the carriage ring 294 and elastomeric rings 340,326 are lowered approximately one half inch through actuation of the chain 284 to position them so that upon extending actuation of the cylinders 305, continuous annular surfaces of the elastomeric rings 340,326 will be brought toward and into continuous annular contact with the actual extended portion cut edges 375,377 of elastomeric material 350 to press such edges 375,377 against the core 146, as shown in FIGS. 25 and 27. The cylinders 305 are then retracted to move the elastomeric rings 340,326 away from the core 146, and the rings 340,326 and associated assembly are raised above the core 146. At this point, the elastomeric material is situated on the core as shown in FIG. 28.

Cut elastomeric material is then removed from the apparatus 100, and the core 146 including the elastomeric material 350 deposited thereon is turned over to again be positioned on the support element 142. After lowering of the support member 142, an additional sheet of elastomeric material associated with mounting rings 352,353 is mounted on the table portion 252, and the entire operation is repeated, with the additional sheet of elastomeric material positioned adjacent the toroidal core 146, along the other, opposite side 364 thereof. The additional elastomeric material 366 is deposited onto the toroidal core 146 along a continuous path thereof, in fact being applied along the other, opposite side 364 of the core 146, and along the inner and outer peripheries 360,362 of the core 146 to adjacent the one side 358 of the core 146. In a manner similar to the previous elastomeric material 350 applied to the core 146, this elastomeric material 366 applied to the core 146 is applied along the inner periphery 360 of the core 146 in a continuously decreasing thickness in the direction away from the other side 364 of the core 146 and overlapping the elastomeric material 350 previously applied to the inner periphery 360 of the core 146. Such elastomeric material 366 of the additional sheet applied to the core 146 also includes elastomeric material applied along the outer periphery 362 of the core 146 in a continuously decreasing thickness in the direction away from the other side 364 of the core 146 and overlapping the elastomeric material 350 previously applied to the outer periphery 362 of the core 146. The additional deposited elastomeric sheet material 366 is cut in a manner similar to that described above, and force is applied to the extended cut portions of elastomeric material 366 extending from the so-deposited elastomeric material subsequent to the cutting to force such extended portions thereof against the elastomeric material 350 and the core 146.

As seen in the drawings, the inner and outer peripheries 360, 362 of the core 146 are substantially straight in cross-section taken across the body of the core 146 perpendicular to the annular axis 368 of the core 146. This results in the tube structure 374 (FIG. 29), being made up of tube portion 376 of elastomeric material 350 and tube portion 378 of elastomeric material 366, also having inner and outer peripheries which are substantially straight and substantially uniform in thickness in cross-section taken across the body of the tube structure 374 perpendicular to the annular axis 368 of the tube structure 374. The tapered surfaces of the inner and outer peripheries described above and applied in the manner as set forth above compliment each other to provide inner and outer peripheries of the tube structure 374 which are generally constant in thickness thereacross. The inner peripheral portion of the tube portion 376 and the inner peripheral portion of the tube portion 378 overlap continuously fully along the straight cross-sectional inner periphery of the tube structure 374, and the outer peripheral portion of the tube portion 376 and the outer peripheral portion of the tube portion 378 overlap continuously fully along the straight outer periphery of the tube structure 374.

As set forth above, the volume of the closed gas chamber may be varied by adding water to or removing water from the tank 234, to vary the characteristics of vacuum applied to the lower surface of the elastomeric sheet material.

It will be understood that the above-described operations may be automated to a great extent, and that, for example, limit switches and stops may be appropriately placed to determine proper positioning of, for example, the core 146 and elastomeric rings 326, 340.

Shown in FIGS. 30–33 is another embodiment of apparatus 400 for forming a portion of a tube, i.e., a sidewall portion or portions, on a toroidal core 402. The apparatus 400 includes a main frame 404 made up of upright beams 406 and upper and lower horizontal beam means 408,410. Elongated upright outer shafts 412 are fixed relative to the main frame 404. The lower beam means 410 has associated therewith and rotatable relative thereto a sprocket and hub assembly 414,416, with internal threads of the hub 416 being in engagement with the external threads of a threaded, vertically disposed shaft 418, similar to the previous embodiment. The upper end of the shaft 418 has fixed thereto a table 420, such table defining apertures through which the respective shafts 412 are relatively movably disposed. It is to be seen that, similar to the previous embodiment, rotation of the sprocket 414 through, for example, chain and motor means (not shown), moves the shaft 418 along its longitudinal axis vertically, without rotation of the shaft 418, such vertical movement of the shaft 418 in turn raising and lowering the table 420 along the shafts 412 and relative to the frame 404 as desired.

The table includes as a part thereof a circular plate 422, which in turn has fixed thereto a plurality of angled positioning members 424 as shown. A cylindrical wall 426 is fixed to the plate 422, and fixed to the upper surface of the wall 426 is a circular plate 428. Such circular plate 428 has fixed to the outer periphery thereof an annular heated knife element 430. The plate 428 defined bores through which are relatively movably disposed studs 432. The lower ends of the studs 432 have nuts 434 threadably engaged therewith, and the upper ends of the studs 432 are threadably engaged with a circular table 436. Resilient springs 438 are disposed about the respective studs 432, and are interposed between the plate 428 and the table portion 436 to resiliently urge them apart. The nuts 434 limit the relative movement of the plate 428 and table portion 436 apart under the resilience of the springs 438. However, it will be seen that the table portion 436 may be moved downwardly relative to the plate 428 against the resilience of such springs 438.

The table portion 436 defines an annular flange portion 440, and such annular flange portion 440 defines bores through which are relatively movably disposed studs 442. The upper ends of such studs 442 are fixed to a circular angled table portion 444 defining a central opening, and nuts 446 are disposed on the lower ends of the studs 442. Resilient springs 448 are disposed about the respective studs 442, and are interposed between the flange portion 440 and the angled table portion 444, to resiliently urge them apart, the movement of the table portion 444 away from the flange portion 440 being limited by the nuts 446. It will be seen that the angled table portion 444 may be moved downwardly relative to the flange portion 440 against the resilience of the springs 448.

The table 420 also defines threaded bores with which bolts 450 are threadably engaged, to extend upwardly from the table 420, being fixed in position relative to said table 420 by means of lock nuts 452.

Positioned upwardly of the table 420 is table 454, which also defines apertures through which the respective shafts 412 are relatively movably disposed. The table 454, it will be seen, is thus also movable upwardly and downwardly relative to the shafts 412 and relative to the frame 404. The table 454 in its lowermost position rests on the extended ends of bolts 456 which are threadably engaged with threaded bores defined by plates 458 fixed to the upright beams 406. Lock nuts 460 are also included in association with such bolts 456 to selectively fix the positioning of such bolts 456 relative to the plate 458.

The table 454 defines a large central circular opening through which may extend the table portion 436, table portion 444, and the annular knife element 430. Extending inwardly of the inner periphery of such table 454 at the opening thereof and slightly below the table 454 are support members 462 as shown. The table 454 defines a plurality of apertures 464 therethrough, through which the respective bolts 450 may extend upon raising of the table 420 relative to the table 454.

Yet another table 466 defines apertures through which the shafts 412 relatively movably extend, so that the table 466 is also movable upwardly and downwardly relative to the shafts 412 and the frame 404. The table 466 defines a large central circular opening, and has fixed thereto adjacent such opening annular flange means 468, to which is in turn fixed an elastomeric ring 470. The table 466 defines threaded bores through which are threadably disposed bolts 472, the positioning of which may be adjusted and locked in place by means of lock nuts 474 associated with the bolts 472.

Fixed to the upper beam means 408 is a cylindrical body 476 including a cylindrical outer wall 478, a top wall portion 480, and a bottom wall portion 482 defining a large circular central opening. A threaded shaft 484 is disposed through the upper beam means 408 and the lower end of such shaft 484 has fixed thereto a plate 486. Guide members 488 are fixed to the top wall portion 480 and relatively movably extend through respective bores defined by the plate 486. A hub and sprocket assembly 490,492 is associated with the upper portion of the shaft 484 and the beam means 408, similar to the previously described systems, and it will be seen that rotation of the sprocket 492 moves the shaft 484 vertically, without rotation of the shaft 484, to in turn move the plate 486 upwardly and downwardly relative to the frame 404 as selected by the operator of the machine.

A plurality of rods 494 have their lower ends fixed to the plate 466 by means of nuts 496, and such rods 494 extend upwardly and relatively movably through apertures 498 defined by the top wall portion 480. The upper ends of such rods 494 have threadably engaged therewith nuts 500, so that the lowermost position of the table 466 is determined by the contacting of the nuts 500 with the top wall portion 480 under the weight of the table 466.

Yet another table 502 is positioned upwardly of the table 466 and below the body 476, and a plurality of hydraulic cylinders 504 interconnect the beam means 408 and table 502. The rods 494 are movably disposed through appropriate apertures 503 provided in the table 502. Extension of the hydraulic cylinders 504 positions the table 502 in its lowermost position shown in FIGS. 30, and retraction of the cylinders 504 may bring the table 502 into contact with the bottom portion 482. The table 502 also defines a large circular central opening therethrough.

Fixed to the plate 486 and extending downwardly therefrom are inner and outer cylindrical walls 506,508. Disposed outwardly of the inner wall 506 is an annular angle member 510, the position of which may be selected relatively toward and away from the plate by means of bolts 512 relatively movably disposed through bores in the radial portion 514 of the angle member 510 and in threaded engagement with threaded bores defined by the plate 486 (FIG. 30), and bolts 516 in threaded engagement with threaded bores in the radial portion 514 of the angle member 510 and which may be brought into contact with the plate 486 (FIG. 32). An elastomeric ring 518 is disposed about the cylindrical portion 520 of the angled member 510, so as to be movable relative thereto along the longitudinal axis of such cylindrical portion. A plurality of bolts 522 are relatively movably disposed through bores in the radial portion 514 and have their extended ends in threaded engagement with the elastomeric ring 518. Helical springs 524 disposed about such bolts 522, enaging the radial portion 514 and the elastomeric ring 518, urge the elastomeric ring 518 downwardly away from the radial portion 514, to bring the heads of the bolts 522 into contact with the radial portion 514. It will be seen that the elastomeric ring 518 may be moved toward the radial portion 514 and the plate 486 upon force applied thereto against the resilience of the springs 524.

The wall 508 has inwardly disposed thereof another annular angle member 526, made up of a cylindrical portion 528 and a radial portion 530. The angle member 526 is adjustably mounted to the plate 486 by means of bolts, similar to the angle member 510.

A plurality of bolts 532 are relatively movably disposed through bores in the radial portion 530, and have their extended ends in threaded engagement with an elastomeric ring 534 disposed within the cylindrical portion 528. A plurality of resilient helical springs 536 are disposed about the respective bolts 532, and tend to urge the elastomeric ring 534 downwardly away from the radial portion 530 and the plate 486, the downward movement of such elastomeric ring 534 being limited by the contacting of the heads of the bolts 532 with the radial portion 530. It will be seen that the elastomeric ring 534 may be moved relatively toward the radial portion 530 and plate 486, upon application of force to the elastomeric ring 534 against the urging of the springs 536.

The plate 486, wall 506, wall 508, angle member 510, and angle member 526 make up mounting means 540 which are movable relative to the frame 404, for mounting the elastomeric rings 518,534.

An annular heated cutting element 542 is fixed to the cylindrical portion 528 outwardly of and generally about the elastomeric ring 534. Another elastomeric ring 544 is fixed to the cylindrical portion 520 generally inwardly of the elastomeric ring 518.

Fixed to the upper portion 480 and extending downwardly therefrom through appropriate bores in the plate 486 to be movable relative thereto are mounting legs 546, which have fixed to their extended lower ends a table portion 548 as shown.

In the operation of the apparatus 400, the tables 420,454,466,502 are positioned as shown in FIG. 30. A toroidal core 402 as shown (which may for example already have elastomeric material as a part thereof) is positioned on the table 454, being supported by the inner periphery of the table 454, and the support members 462. A sheet of elastomeric material 550 disposed between two rings 552,554 (FIG. 32) is positioned on the table along one side of the core 402, similar to the previous embodiment. After the sheet material 550 is placed on the table 502, the cylinders 504 are retracted to bring the sheet material 550 into engagement with the bottom portion 482 so that the body 476 and sheet material 550 form a closed chamber, and a low air pressure may be applied to this closed chamber. The sprocket 414 is then rotated to raise the table 420, the bolts 450 passing through the appropriate apertures 464 as described above. The table 420 is raised sufficiently relative to table 454 so that the toroidal core 402 is seated on the plate 422 about the angled guides 424, such angled guides 424 acting to properly center the toroidal core 402 relative to the table 454. The plate 422 is provided with appropriate openings in which the support members 462 seat upon the bringing of such table 420 close to the table 454. During such operation, of course, the annular knife element 430 and table portions 436,444 are being raised with the table 420. Upon such contacting of the support members 462 with the table 454, the table 420 and table 454 move upwardly together along the shafts 412, until the heads of the bolts 450 contact the table 466. The positioning of such heads of bolts 450 is chosen so that the elastomeric ring 470 is now carried quite close to the surface of the toroidal core 402. Upon such contacting of the heads of the bolts 450 with the table 466, the table 420, table 454 and table 466 move upwardly together relative to the frame 404.

The table 420, table 454 and table 466 are raised together, along with the toroidal core 402, to bring the toroidal core 402 into continuous annular contact with the elastomeric sheet material 550, so that elastomeric material 550 of said sheet thereof is deposited on the toroidal core 402 along a continuous path thereof. At approximately this time, the table portion 436 and table portion 548 are quite close together with elastomeric material 550 of the sheet thereof squeezed therebetween, so that the central portion of the sheet of elastomeric material 550 is supported, along with the outer periphery thereof. The resilience of the springs 438, of course, provides for proper holding of such portion of the sheet material between the table portions 436,548 and openings 551 are provided in the plate 422 and table 420 to allow for downward movement of the studs 432 relative thereto (FIG. 31).

The toroidal core 402 is further raised through movement of the table 420, table 454 and table 466, until the extended ends of the bolts 472 contact the already-raised table 502 to determine the upward limit of movement of the toroidal core 402. The sprocket 492 is then rotated through appropriate chain and motor means to lower the plate 486 and elastomeric rings 518,534,544 therewith, to bring continuous annular surfaces of the elastomeric rings 518,534 into continuous annular contact with elastomeric sheet material 550 deposited on the core 402. The elastomeric rings 518,534 are movable relative to the mounting means 540 relatively toward and away from the core 402, the resilient springs 524,536 allowing such movement. Similar to the elastomeric rings in the previous embodiment, such elastomeric rings 534,518 act to apply force to or stitch annular portions of the elastomeric material 550 to the core 402 independent of the initial force which deposited elastomeric material on the core 402. Further downward movement of the mounting means 540 results in the annular knife element 430, now adjacent the inner periphery of the core 402, being brought into contact with elastomeric sheet material 550 not deposited on the core 402, the cutting force of such annular knife element 430 being applied through the elastomeric material to the elastomeric ring 544. Such further movement also results in the annular knife element 542, now adjacent the outer periphery of the core 402, being brought into contact with elastomeric material 550 not deposited on the core 402, such cutting force actually being applied through such elastomeric sheet material not deposited on the core 402 to the elastomeric ring 470.

Such positioning of appropriate elements is shown most clearly in FIG. 33. It will be seen that with the particular association of the elastomeric rings 518,534 and mounting means 440, the elastomeric rings 518,534 are moved against the resilience of springs 524,536 under the force of the toroidal core 402 applied thereto to allow the annular knife elements 542,430 to come into play.

Upon completion of the operation heretofore described, the sequence of steps may be reversed to lower the toroidal core 402, which has deposited thereon such portion of elastomeric material 550. The extending cut edges may then be pressed to the core 402 by any appropriate means. For example, the toroidal core 402 may be lowered sufficiently to bring the outer cut edge below the elastomeric ring 470, and the toroidal core 402 may then be raised so that the elastomeric ring 470 acts on the outer extended portion cut edge to press such extended portion cut edge against the core 402. In this manner, sidewall portions of the tube to be formed may be deposited on the core 402. It is to be understood that, again, the core 402 being operated on may already include appropriate elastomeric material to which are added the sidewall portions through operation of the apparatus 400.

What is claimed is:

1. A toroidal tube structure comprising:
   a first tube portion defining a side portion and inner and outer peripheral portions, and a second tube portion defining a side portion and inner and outer peripheral portions overlapping to an extent the respective inner and outer peripheral portions of the first tube portion; and
   wherein the outer peripheral portion of the first tube portion is of a continuously decreasing thickness in the direction away from the side portion of said first tube portion, the inner peripheral portion of the first tube portion is of a continuously decreasing thickness in the direction away from the side portion of the first tube portion, the outer peripheral portion of the second tube portion is of a continuously decreasing thickness in the direction away from the side portion of the second tube portion, and the inner peripheral portion of the second tube portion is of a continuously decreasing thickness in the direction away from the side portion of the second tube portion; and
   wherein each of the inner and outer peripheries of the tube structure is substantially straight in cross-section taken across the body of the tube structure perpendicular to the annular axis of the tube structure; and
   wherein the inner peripheral portion of the first tube portion and the inner peripheral portion of the second tube portion overlap continuously and fully along the straight cross-sectional inner periphery of the tube structure, and wherein the outer peripheral portion of the first tube portion and the outer peripheral portion of the second tube portion overlap continuously and fully along the straight outer periphery of the tube structure.

2. A toroidal tube structure having inner and outer peripheries substantially straight in cross-section taken across the body of the tube structure perpendicular to the annular axis of the tube structure, comprising a first tube portion defining a side portion and inner and outer peripheral portions, and a second tube portion defining a side portion and inner and outer peripheral portions, said inner peripheral portions of the first and second tube portions overlapping continuously and fully along the straight cross-sectional inner periphery of the tube structure, said outer peripheral portions of the first and second tube portions overlapping continuously and fully along the straight outer periphery of the tube structure, said inner and outer peripheral portions of the first tube structure being of a continuously decreasing thickness in the direction away from the side portion of the first tube portion, said inner and outer peripheral portions of the second tube portion being of a continuously decreasing thickness in the direction away from the side portion of the first tube portion.

* * * * *